(12) United States Patent
Wilson et al.

(10) Patent No.: US 9,073,630 B2
(45) Date of Patent: Jul. 7, 2015

(54) HELICOPTER DRIP PAN APPARATUS AND METHOD OF MAKING AND USING SUCH AN APPARATUS

(75) Inventors: Peggy Lynn Wilson, McKee, KY (US); Thomas G. Wilson, McKee, KY (US); Timothy J. Hite, Richmond, KY (US); Faron D. Carl, McKee, KY (US); Todd E. Wilson, McKee, KY (US)

(73) Assignee: Phoenix Products, Inc., McKee, KY (US)

( * ) Notice: Subject to any disclaimer, the term of this patent is extended or adjusted under 35 U.S.C. 154(b) by 359 days.

(21) Appl. No.: 13/492,385

(22) Filed: Jun. 8, 2012

(65) Prior Publication Data

US 2012/0312914 A1 Dec. 13, 2012

Related U.S. Application Data

(60) Provisional application No. 61/495,155, filed on Jun. 9, 2011.

(51) Int. Cl.
*B64C 27/04* (2006.01)
*B64C 27/12* (2006.01)
*F16N 31/00* (2006.01)

(52) U.S. Cl.
CPC ............... *B64C 27/12* (2013.01); *F16N 31/002* (2013.01); *F16N 31/006* (2013.01); *Y10T 29/49815* (2015.01); *Y10T 156/1052* (2015.01)

(58) Field of Classification Search
USPC ................. 244/17.11, 17.21, 17.23, 60, 99.3; 184/106; 202/326, 806, 378277/598; 277/598
See application file for complete search history.

(56) References Cited

U.S. PATENT DOCUMENTS

| | | | |
|---|---|---|---|
| 2,053,297 | A | 9/1936 | Nittel |
| 2,383,200 | A | 8/1945 | Kramer et al. |
| 2,475,836 | A | 7/1949 | Henricksen et al. |
| 3,779,330 | A | 12/1973 | Longpre |
| 3,971,511 | A | 7/1976 | Casey |
| 4,394,853 | A | 7/1983 | Lopez-Crevillen et al. |
| 4,682,672 | A | 7/1987 | Berger et al. |
| 4,936,483 | A | 6/1990 | Ballu |
| 5,018,407 | A | 5/1991 | Hoecht |

(Continued)

OTHER PUBLICATIONS

International Search Report and Written Opinion issued in International Application No. PCT/US2008/086807; Apr. 14, 2009; 12 pages; European Patent Office.

(Continued)

*Primary Examiner* — Benjamin P Lee
(74) *Attorney, Agent, or Firm* — Wood, Herron & Evans, LLP

(57) ABSTRACT

A drip pan apparatus for a helicopter includes a frame and a drip pan. The frame is secured to a skirt on the airframe of the helicopter. The apparatus includes a drip pan for cooperation with a frame to cover an access opening to a transmission. The drip pan includes a substantially planar member of a fiber-reinforced composite and has a seal surface that is configured to cooperate with a seal surface of the frame. A seal member may be disposed between the substantially planar member and the frame to form a fluid-tight seal. The fiber-reinforced composite may be a carbon fiber-reinforced composite. A method of making the drip pan apparatus includes placing a plurality of sheets of an uncured fiber-reinforced composite material on one another to form an uncured stack. The uncured stack is then cured. A frame and a drip pan may be cut from the cured stack.

8 Claims, 17 Drawing Sheets

(56) References Cited

U.S. PATENT DOCUMENTS

| | | |
|---|---|---|
| 5,411,116 A | 5/1995 | Kish et al. |
| 5,421,474 A | 6/1995 | Ramillon et al. |
| 5,531,196 A | 7/1996 | Clark |
| 5,544,632 A | 8/1996 | Choate |
| 6,112,856 A | 9/2000 | Wilson |
| 6,216,823 B1 | 4/2001 | Wilson |
| D444,443 S | 7/2001 | Wilson et al. |
| 6,446,907 B1 | 9/2002 | Wilson et al. |
| 6,729,576 B2 | 5/2004 | Kay et al. |
| 8,096,496 B2 | 1/2012 | Wilson |
| 2006/0037427 A1 | 2/2006 | Holub |

OTHER PUBLICATIONS

Taiwanese Intellectual Property Office; Office Action issued in Taiwanese Patent Application No. 097149919; Jun. 13, 2012; 6 pages.

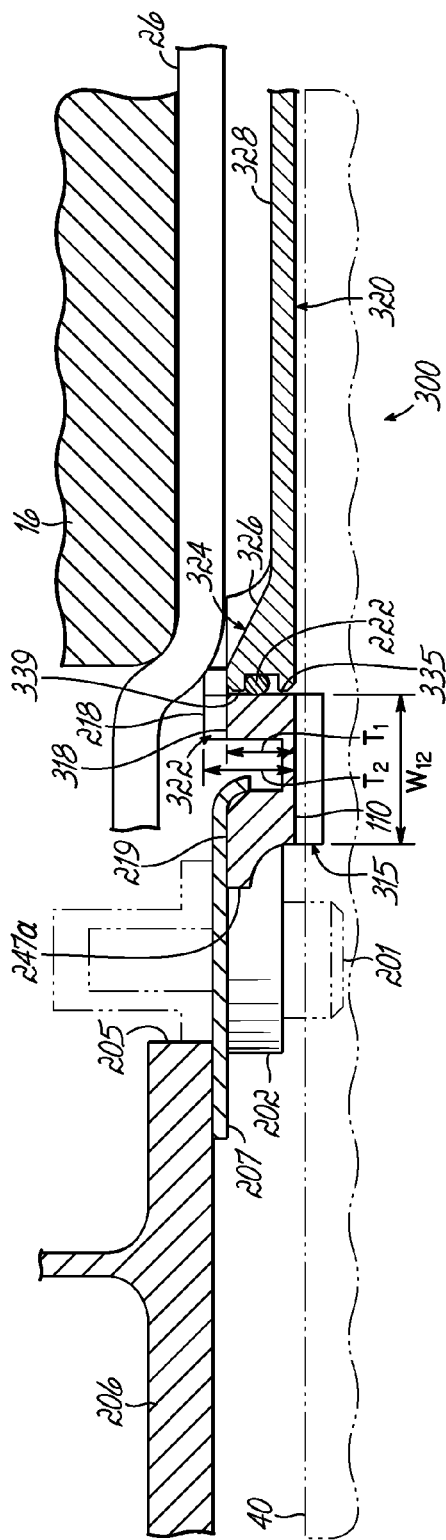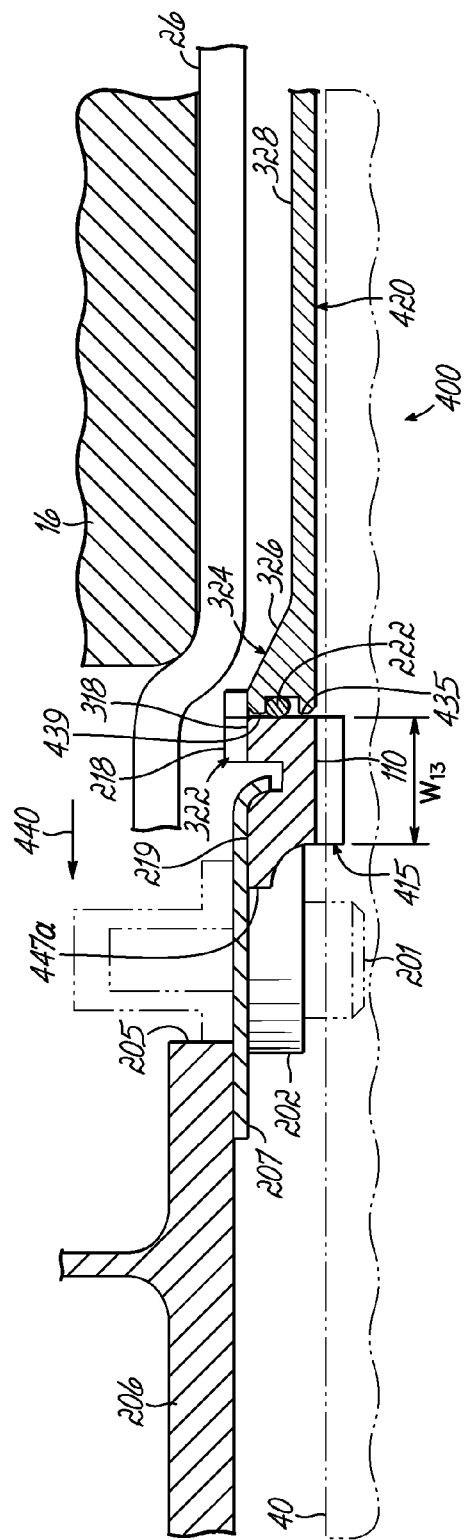
FIG. 7A
FIG. 7B

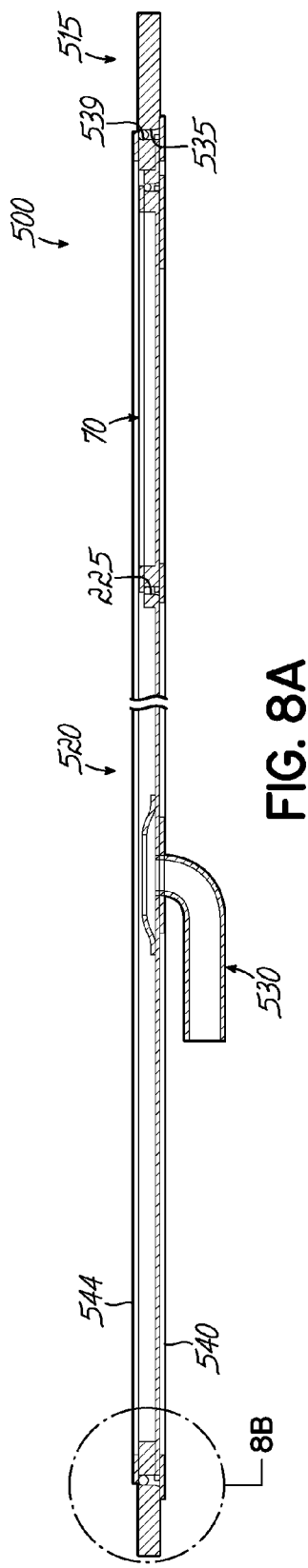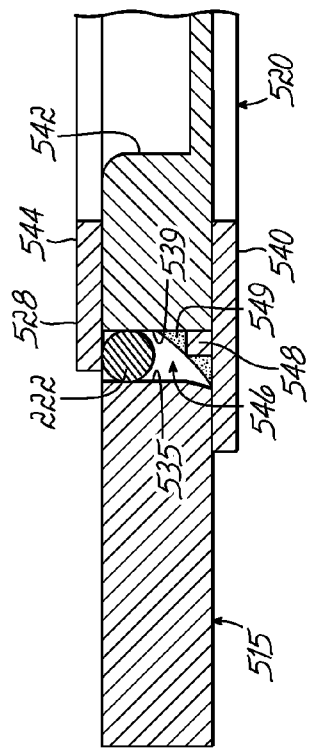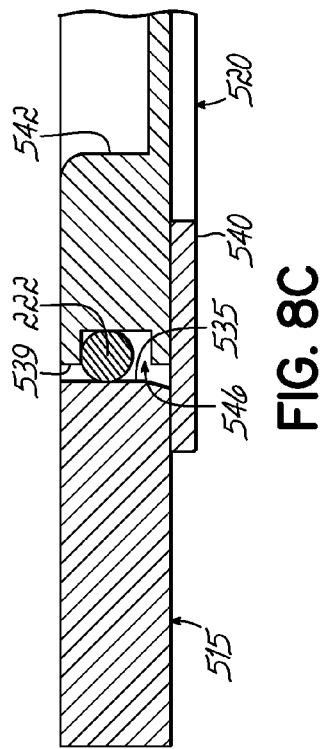

HELICOPTER DRIP PAN APPARATUS AND METHOD OF MAKING AND USING SUCH AN APPARATUS

CROSS REFERENCE TO RELATED CASES

This application claims priority to U.S. Provisional Patent Application Ser. No. 61/495,155 filed Jun. 9, 2011, the disclosure of which is incorporated by reference herein in its entirety.

FIELD OF THE INVENTION

This invention relates to a drip pan, and more specifically to drip pans and other apparatuses for use on a helicopter.

BACKGROUND OF THE INVENTION

Larger helicopters, in general, have several features in common in a basic configuration or layout. For instance, a typical helicopter will have a cabin section rearward of the pilot's cockpit or flight deck and which is used to transport people, cargo or both. In addition, the helicopter will have an engine compartment, which is located typically above and to the rear of the pilot's cockpit or flight deck and above the cabin section. The engine compartment typically houses two primary components, at least one engine and a rotor transmission at least partially contained within a transmission housing.

Both the engine and the rotor transmission contain numerous fluids, such as petroleum-based lubricants, that are critical to the operation of the engine and the transmission. These fluids inevitably leak from various locations in the engine and the transmission during both the operation and storage of the helicopter. Because the engine compartment is generally oriented above the cabin section, any leaking fluids eventually seep or drip into the cabin section unless proper sealing mechanisms are in place. The inflow of these leaking fluids can spoil, stain, or damage the cabin's interior materials, such as, seat covers and acoustic linings. In addition, the leaking fluids can severely damage or destroy sensitive electronic equipment that may be placed in the cabin section of a helicopter.

During routine inspection and maintenance it is necessary to have both ready visual and physical access to portions of the engine or at least the rotor transmission. Such access is required to check critical fluid levels; to replace worn, damaged or depleted parts or filters; or to adjust mechanical systems. Typically, various access panels in or around the engine or transmission compartments provide the requisite openings to achieve ready access to the engine and the rotor transmission. In some helicopters, a forged or fixed airframe structure forms an access opening that is located below the rotor transmission housing and above the cabin section. The opening is thus accessible through the cabin's ceiling. This access opening, however, must be sealed by a cover against the inevitable oil and fluid drippings which the engine and the rotor transmission will produce, as well as against water leakage into the cabin.

The access opening below the engine compartment in the helicopters, such as the "M" model BLACKHAWK® helicopter, made for the United States by Sikorsky Aircraft Company of Stratford, Conn., is defined by both the aircraft structural forgings and a flexible or yieldable downwardly-turned skirt which is riveted onto the helicopter's forged structure. The skirt is thin and many times more flexible relative to the helicopter's forged structure.

Prior cover designs included a covering plate that is attached directly to the flexible skirt with a hollow seal sandwiched therebetween. One hollow seal used in prior designs resembled the flexible, hollow door seals used around car doors or refrigerator doors. However, the skirt contains surface aberrations, such as, the protruding rivet heads from the rivets that secure the skirt to the forged helicopter structure. When the seal engages both the skirt and the rivet heads, it may be displaced or deformed enough to create gaps between the seal and the skirt. Leakage of fluids past the seal may then occur. Accordingly, the hollow seal traversing these aberrations, though sandwiched between the skirt and the covering plate, is generally unable to provide a suitable, consistent, long-term fluid seal. Moreover, flexing of the flexible skirt during operation of the helicopter could, in addition or alternatively to gapping described above, also cause the seal to gap thereby allowing fluid leakage. Drip pan structures disclosed in U.S. Pat. Nos. 6,112,856; 6,216,823; 6,446,907; and Design Pat. No. D444,443, which are fully incorporated herein by this express reference, provide improvements and solutions to the aforementioned difficulties.

The "M" model is being produced by Sikorsky and is in service with the U.S. military, for example, in Afghanistan. In the "M" model, and in other aircraft with what are or will be similarly-shaped skirts, the access opening has at least one corner of the skirt pulled outwardly to allow direct and straight-through access to the filter, alleviating the need to tilt or otherwise reorient a filter for removal and/or installation in prior model BLACKHAWK® helicopters. However, the aforementioned structures are not readily adaptable for use with the "M" Model BLACKHAWK® helicopter due to a change in configuration of the skirt. In this regard, an improved drip pan apparatus for such a skirt configuration, such as that disclosed in U.S. Publication No. 2009/0159739, which is incorporated herein in its entirety, addresses the problems created by the "M" model skirt configuration.

In addition to shielding the cabin from fluid, the geometry of the pan structures cannot protrude significantly into the interior of the cabin section. Any protrusion from the ceiling that further reduces the available head room of the cabin section is undesirable and may be prohibited by regulation. For example, regulations may prohibit protrusions which decrease the available "head room" for a person of a specific height or taller. In addition, because weight is critical to the operation of any aircraft, heavy cover constructions are undesirable.

However, in addition the aforementioned problems and limitations, other problems and limitations have been identified with the "M" model. In this regard and by way of example, FIG. 1 shows a configuration of a typical BLACKHAWK® helicopter 10, for example, a "M" Model BLACKHAWK® helicopter. In the configuration shown, the helicopter 10 has a cabin 12 (dashed outline) in which passengers, equipment, and cargo may ride during flight. Located just above the cabin 12 is at least one engine 14 which powers to a rotor transmission 16. The rotor transmission 16 is operatively connected to a shaft 18 which imparts rotary motion to the main rotor 20. The rotor transmission 16 is also operatively connected via a drive shaft (not shown) to a tail rotor 22.

The rotor transmission 16 requires frequent inspection and maintenance to ensure its proper operation. To facilitate easy and ready access to the rotor transmission 16, one or more rotor transmission access openings may be provided on both the exterior and interior of the helicopter. For example, a transmission access opening 205 may be located within the cabin 12 to provide the requisite access to the rotor transmission 16 that is situated directly above the cabin 12. The access opening 205 generally has some type of removable cover, to separate the transmission 16 from the cabin area 12.

As shown in FIG. 2A, to accommodate attachment of such a removable cover, a flexible skirt 207 may be secured to an airframe member 206 around the periphery of opening 205 by rivets 28. Skirt 207 may be many times more flexible than the access opening 205 as is defined by the airframe member 206, to which it is attached. To prevent leakage of fluid into the cabin 12, a pan structure, for example, a drip pan apparatus 200 shown in FIGS. 2A, 2B, 3A, and 3B may be used to cover and seal the access opening 205.

The cabin 12 is more fully illustrated in FIG. 3A. The helicopter 10 may be equipped to transport personnel or equipment generally or may be equipped for a specific mission or to perform a specific function. By way of example, the interior of the cabin 12 may be outfitted with the equipment necessary to insert and/or extract soldiers from the battlefield. In this regard, a Fast-Rope Insertion and Extraction System (FRIES) 30 may be installed to the ceiling of the cabin 12 below the transmission 16.

The FRIES 30 generally includes a main tube or bar 32 that may be secured to the airframe member 206 (shown in FIG. 2A) with barrel nuts (not shown) or the like on both sides of the access opening 205. The bar 32 generally spans the access opening 205 and is positioned directly below the drip pan apparatus 200. The FRIES 30 may include one or more extendable/retractable or telescoping locking mount bars 34 that slidably engaged the bar 32. The telescoping bars 34 may be selectively extendable to project from the cabin 12. In operation, once the bar 34 is extended, one or more rappelling ropes or a cable (not shown) may dangle from one of the bars 34. In this extended configuration, personnel may rappel from the helicopter 10 or be extracted from a lower surface while the helicopter 10 remains aloft.

As shown in FIG. 3A, attachment of the FRIES 30 to the ceiling of the cabin 12 leaves little, if any, clearance between the drip pan apparatus 200 and the bars 32, 34. As is described in more detail below, the lack of clearance between the bars 32, 34 and the drip pan apparatus 200 creates problems with the inspection and maintenance of the transmission 16 via access opening 205 and restricts the configuration, including the dimensions, of the drip pan apparatus 200. By way of example, the FRIES 30 may be spaced from the drip pan apparatus 200 by at most about 2 inches, and by way of additional example may be spaced from the drip pan apparatus 200 from about one-half inch to about 2 inches. It will be appreciated that other bar configurations may be secured to the airframe 206, span the access opening 205, and may be used to support a winch or other device for lowering and/or lifting personnel, weapons, or other equipment to or from the cabin from below the helicopter 10. Furthermore, other equipment, for example, troop seat bars (not shown), may be supported by other bar configurations secured to the ceiling of the helicopter in the same or similar position as the FRIES 30 and impede access to the transmission 16 and, in some instances, block access to the tabs 202 (described below) along one or more sides of the apparatus 200.

By way of additional example and with reference FIG. 3B, the helicopter 10 may be equipped as a MedEvac. In this regard, a medevac bar 40 rather than the FRIES 30, described above, may be secured to the ceiling of the cabin 12. Typically, similar to the bars 32, 34, the medevac bar 40 is attached to the airframe member 206 on each side of the access opening 205 such that the bar 40 spans across the access opening 205. As such, the medevac bar 40 is directly below the drip pan apparatus 200. However, unlike the FRIES bar 32, 34, the medevac bar 40 generally defines a top rotation point of a rotatable partition 42 that partially divides the cabin 12 and that supports one or more litters or stretchers 44. The partition 42 may be selectively positionable about an axis 46. Stretchers may be loaded onto the partition 42 and the partition 42 may then be rotated 90 degrees prior to helicopter liftoff.

When the helicopter 10 is so equipped, the medevac bar 40 is spaced from the drip pan apparatus 200. The clearance between the drip pan apparatus 200 at any particular location and the medevac bar 40 may be less than that of the FRIES bars 32, 34. For example, the clearance between the medevac bar 40 and the drip pan apparatus 200 may be on the order of a few thousandths of an inch and may be roughly equivalent to the thickness of a sheet of paper (e.g., 0.002 to 0.006 inches).

In each of these exemplarily equipped helicopters, the mission specific equipment is positioned immediately or directly below the drip pan structure. The position of the equipment and the necessity that it be securely fastened to the frame member 206 complicates access through the access opening 205. As a result, inspection and maintenance of the transmission 16 from within the cabin 12, which may only be accessible via the access opening 205, is made troublesome or nearly impossible by the mission specific equipment. Generally, the mission specific equipment may span the access opening 205 or otherwise partially block or interfere with access to the transmission 16 through the access opening 205, as is exemplified by the Medevac or FRIES bar, above. In spite of this interference or blockage, the configuration of the drip pan structure must allow for attachment of mission critical equipment on the one hand, but allow for inspection of the transmission 16 and, when necessary, removal of the pan structure or at least a portion thereof without removal of the mission critical equipment on the other hand.

For instance, the FRIES 30 (FIG. 3A) or the medevac bar 40 (FIG. 3B) interferes with the inspection and maintenance of the transmission 16 via the access opening 205. However, removal of either one to gain full access through the access opening 205 may require initial removal of other equipment, for example, the associated rotatable partition 42 in the case of the medevac bar 40. Similarly, removal of the FRIES 30 that spans the access opening 205 is not only difficult or impossible without damaging that or other equipment or helicopter 10, but it is also time consuming. Thus, full access through the access opening 205, while desirable, is often not economically nor logistically feasible once the helicopter 10 is outfitted for a specific mission or purpose. Although specific mission equipment (e.g., the FRIES 30 and medevac bar 40) are described above, it will be appreciated that other similar systems may be installed to the ceiling in the cabin 12 to provide similar or alternative functions for a specific mission or operation.

In addition to the space constraints imposed by mission specific equipment or possibly due to the space constraints, applicant recognized another issue with the BLACK-HAWK® "M" model helicopter. In particular, the "M" model fails to provide sufficient clearance between the transmission and the prior drip pans and/or within the cabin between the cabin floor and prior pans. That is, one or both of these dimensions may be insufficient. As is described in more detail below in conjunction with FIGS. 4 and 5, there is a wire bundle that passes between the transmission and prior pan. It was recognized that the wire bundle for the "M" model is larger than previous models, and that the distance between the transmission and prior pans would not adequately accommodate the relative increase in size. A solution to which is exacerbated by the spacial constraints set forth above. Accordingly, simply moving the pan structure away from the transmission may not be a solution and may cause additional problems.

Accordingly, it is one objective to provide an improved leak-proof drip pan structure for use in BLACKHAWK® helicopters.

Another objective is to provide an improved drip pan structure that will allow inspection of an engine or transmission compartment from a cabin section of a helicopter without first removing mission specific equipment from the cabin section thereof.

Another objective is to provide an improved drip pan structure that will effectively and consistently seal fluid from passage from an engine or transmission compartment to a cabin section of a BLACKHAWK® "M" model helicopter and similar airframes.

Another objective is to provide an improved drip pan structure which permits quick visual and physical access to the engine or transmission compartment of a BLACKHAWK® "M" model helicopter and similar helicopters without requiring modification to the existing aircraft structure.

Still another object of this invention is to provide a drip pan structure that can be attached to the existing structure of a BLACKHAWK® "M" model helicopter while both improving the headroom available in the cabin and providing clearance to other existing components, including a wire bundle, proximate the transmission.

SUMMARY OF THE INVENTION

To these and other ends, in one embodiment, there is a drip pan for cooperation with a frame for covering an access opening to a rotor transmission of a helicopter. The frame has a seal surface. The drip pan includes a substantially planar member of a fiber-reinforced composite and has a seal surface that is configured to cooperate with a seal member disposed between the substantially planar member and the frame to form a fluid-tight seal between the seal surface of the substantially planar member and the seal surface of the frame to seal the access opening from fluid leakage. In one embodiment, the fiber-reinforced composite is a carbon fiber-reinforced composite.

In one embodiment, there is a drip pan apparatus for a helicopter having an airframe member defining an access opening. A skirt is secured to the airframe member around the periphery of the access opening. The drip pan apparatus includes a frame of a fiber-reinforced composite and an inwardly-facing peripheral surface. The frame is adapted to be secured to the skirt. A drip pan of a fiber-reinforced composite defines an access port and has an outwardly-facing peripheral surface that is configured to cooperate with the inwardly-facing peripheral surface of the frame. At least one of the inwardly-facing peripheral surface and the outwardly-facing peripheral surface is a machined surface. A seal member is configured to be disposed between the inwardly-facing peripheral surface and the outwardly-facing peripheral surface and configured to form a fluid-tight seal between the drip pan and the frame.

In one embodiment, there is a drip pan apparatus for use with a helicopter having a cabin section, a rotor transmission oriented at least in part above the cabin section, a rotor transmission access opening defined by an airframe member of the helicopter in the ceiling of the cabin section, a skirt secured to the airframe member around the periphery of the access opening, and a wire bundle between the rotor transmission and the cabin section. The drip pan apparatus includes a frame adapted to be attached to the skirt. The frame has an inwardly-facing peripheral surface. A drip pan is configured to cooperate with the frame and has an outwardly-facing peripheral surface. A seal member is disposed between the outwardly-facing peripheral surface and the inwardly-facing peripheral surface. At least one of the frame and the drip pan has a discontinuous edge structure configured to face the transmission and to accommodate the wire bundle proximate the frame and/or the pan when the frame is attached to the helicopter and the drip pan is removably secured to the frame.

In one embodiment, there is a method of removing a drip pan from a helicopter having a cabin section, a rotor transmission oriented at least in part above the cabin section, a rotor transmission access opening in the ceiling of the cabin section, special operations equipment spanning the access opening, and a drip pan apparatus covering and sealing the access opening. The drip pan apparatus has a drip pan detachably secured to a frame. The drip pan includes a first drain line coupled to a first drain tube that is attached to the helicopter at a first location. A drain port assembly is detachably secured to the drip pan and includes a second drain line coupled to a second drain tube that is attached to the helicopter at a second location different from the first location. The special operations equipment is positioned between the first drain line and the second drain line. Movement of the drip pan to remove the drip pan from the frame causes the special operations equipment to interfere with one of the first or second drain lines. The method includes detaching the drain port assembly from the drip pan to expose an access port. The drain port assembly remains coupled to the second drain tube and attached to the helicopter at the second location. The method further includes releasing the drip pan from the frame and sliding the drip pan in a direction that moves the access port between the special operations equipment and the rotor transmission to remove the drip pan from the frame. Once removed, a technician may access the rotor transmission through the opening.

In one embodiment, there is a method of making a drip pan apparatus for a helicopter having an airframe member defining an access opening. The helicopter includes a skirt secured to the airframe member around the periphery of the access opening. The method includes placing a plurality of sheets of an uncured fiber-reinforced composite material on one another to form an uncured stack. The uncured stack is then cured. The method further includes cutting a frame and a drip pan from the cured stack. Cutting the frame forms an inwardly-facing peripheral surface, and cutting the drip pan forms an outwardly-facing peripheral surface. The inwardly-facing peripheral surface and the outwardly-facing peripheral surface are each configured to sealingly engage a seal member and form a fluid-tight seal therebetween.

The above and other objectives and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with the general description of the invention given above and the detailed description of embodiments given below, serve to explain the principles of the present invention.

FIG. 7A is a cross-sectional view of one embodiment of a drip pan apparatus taken along a section line 7A-7A of FIG. 6;

FIG. 7B is a cross-sectional view of one embodiment of a drip pan apparatus taken along a section line 7A-7A of FIG. 6;

FIG. 8A is a cross-sectional view of the drip pan apparatus of FIG. 8 taken along section line 8A-8A;

FIG. 8B is an enlarged view of the encircled area 8B of FIG. 8A depicting one embodiment of the drip pan apparatus of FIG. 8A;

FIG. 8C is an enlarged view of the encircled area 8B of FIG. 8A depicting an alternative embodiment of the drip pan apparatus of FIG. 8A;

DETAILED DESCRIPTION OF INVENTION

To those ends, embodiments of the present invention address the minimal clearance between mission specific equipment while sealing the access opening 205 from fluid leakage. Additionally, these embodiments also address or allow access through the access opening 205 of the helicopter without removal of the mission specific equipment. However, in addition to the challenges posed by limited space available between mission specific equipment secured to the ceiling of the cabin 12 and, for example, the drip pan apparatus 200, as briefly set out above, there is another problem with the "M" model BLACKHAWK® helicopter.

Figure 4:
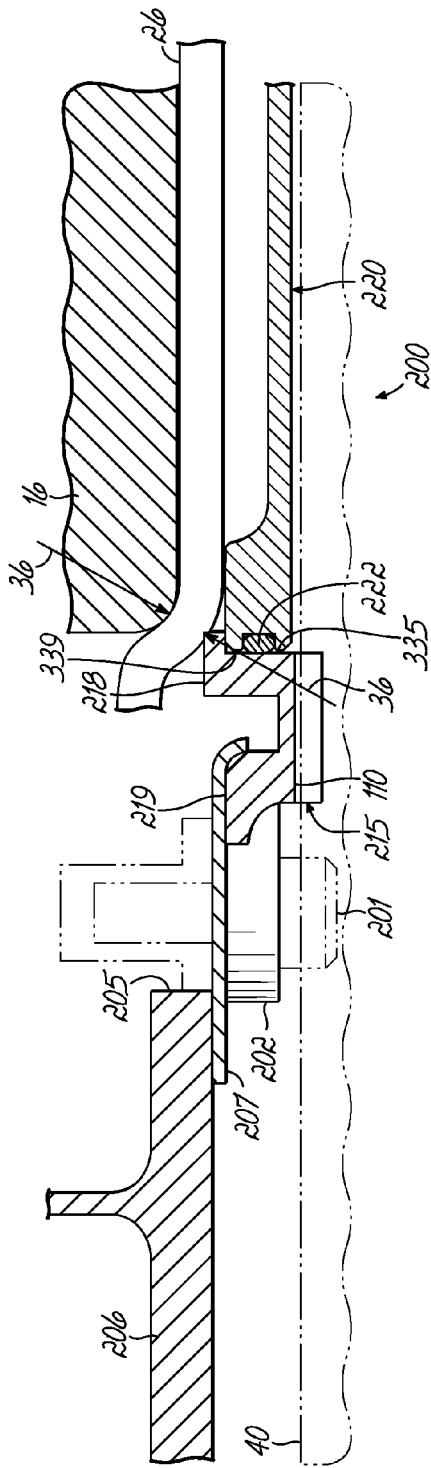
FIG. 4 is a cross-sectional view of a drip pan apparatus taken along section line 4-4 in FIG. 3B.

With reference now to FIG. 4, it is known that a wire bundle 26 passes between the apparatus 200 and the transmission 16. The wire bundle 26 contains a plurality of individual wires that carry electrical signals or electrical power between different components of the helicopter 10. Applicant recognized that the wire bundle 26 may contact portions of the drip pan apparatus 200 and/or may also contact the transmission 16 and that it is the combination of these components, including the size of the wire bundle 26 relative to prior wire bundles, that may cause contact of the wire bundle 26 with the transmission 16 and the drip pan apparatus 200. In some configurations, it is thought that the wire bundle 26 may actually be forcibly sandwiched between a portion of the pan structure and the transmission 16. By way of example and with reference to FIG. 4, installation of the drip pan apparatus 200 over the access opening 205 may force the wire bundle 26 into contact with the transmission 16 or otherwise pinch the wire bundle 26 between the two.

One illustrative pinch point that may occur is indicated by the arrows 36 in FIG. 4. It will be appreciated that the illustrated point is merely an exemplary contact region between the wire bundle 26 and the transmission 16 and there may be other locations at which the wire bundle 26 contacts both the transmission 16 and the adjacent pan structure. Contact between the wire bundle 26 and another component, e.g., the drip pan apparatus 200 and/or the transmission 16, is not desirable. Although the contact force may be minimal, the long term result of this configuration may be detrimental to the operation of the helicopter 10.

In this regard, and by way of example, there are at least two problems that may be associated with pinching the wire bundle 26 between the drip pan apparatus 200 and the transmission 16. One problem is that one or more of the individual wires in the bundle 26 may be chafed due to the normal vibration of the helicopter 10 that causes relative movement at the contact or pinched location. If sufficiently chafed, the metal of the wire may become exposed and electrical problems, such as, electrical shorts, may result.

While wire chafing may be a source of electrical problems, the other, and vastly more costly problem, is that the transmission 16 may also be chafed or be worn by the wire bundle 26. In addition, or alternatively, as is known, transmissions are sensitive to foreign material, for example, the debris produced by wire chafing or as an indirect result thereof. Introduction of foreign material or direct wear of transmission 16 may cause a reduction in serviceable life of the transmission 16 or outright mechanical failure thereof. It will be appreciated that these problems are exemplary only and other problems may be the direct or indirect result of pinching the wire bundle 26 between the drip pan apparatus 200 and the transmission 16. While various embodiments of drip pans are shown and described herein with reference to the BLACKHAWK® Model "M" helicopter, it will be appreciated that these embodiments may find use in numerous other helicopter makes and models.

Figure 5:
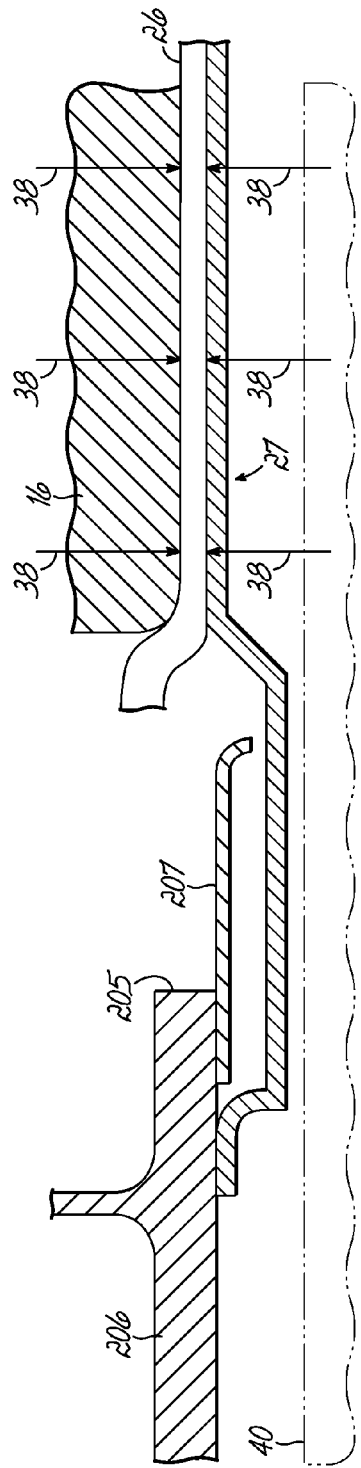
FIG. 5 is a cross-sectional view of a configuration of a prior drip pan structure taken along section line representative of section line 4-4 in FIG. 3B.

With reference to FIG. 5, there is shown a prior pan structure at 27. As shown, the pan structure 27 provides clearance between the mission critical equipment, e.g., the medevac bar 40 (as shown in phantom line). However, the additional clearance is achieved at the expense of compressing the wire bundle 26 against the transmission 16. This compression may extend over the length of the wire bundle 26, as shown by the arrows 38. The configuration of the pan structure 27 fails to recognize compression or pinching of the wire bundle 26 against the transmission 16 as a problem. As set forth above, there may be direct, negative consequences to such a configuration. In addition, this prior art structure also relies on a sandwich type seal. Thus, in addition to failing to recognize pinching of the wire bundle 26, this configuration may not be resistant to fluid leakage during operation of a helicopter so equipped.

Figure 1:
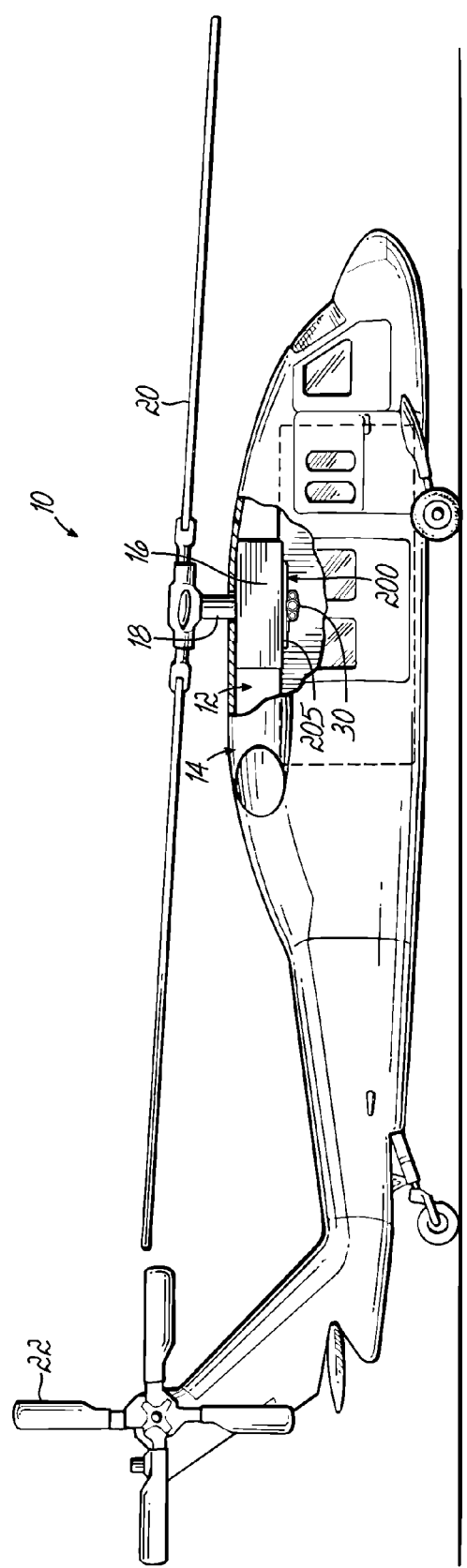
FIG. 1 is a side elevation view of a helicopter according to one embodiment of the invention.
Figure 2A:
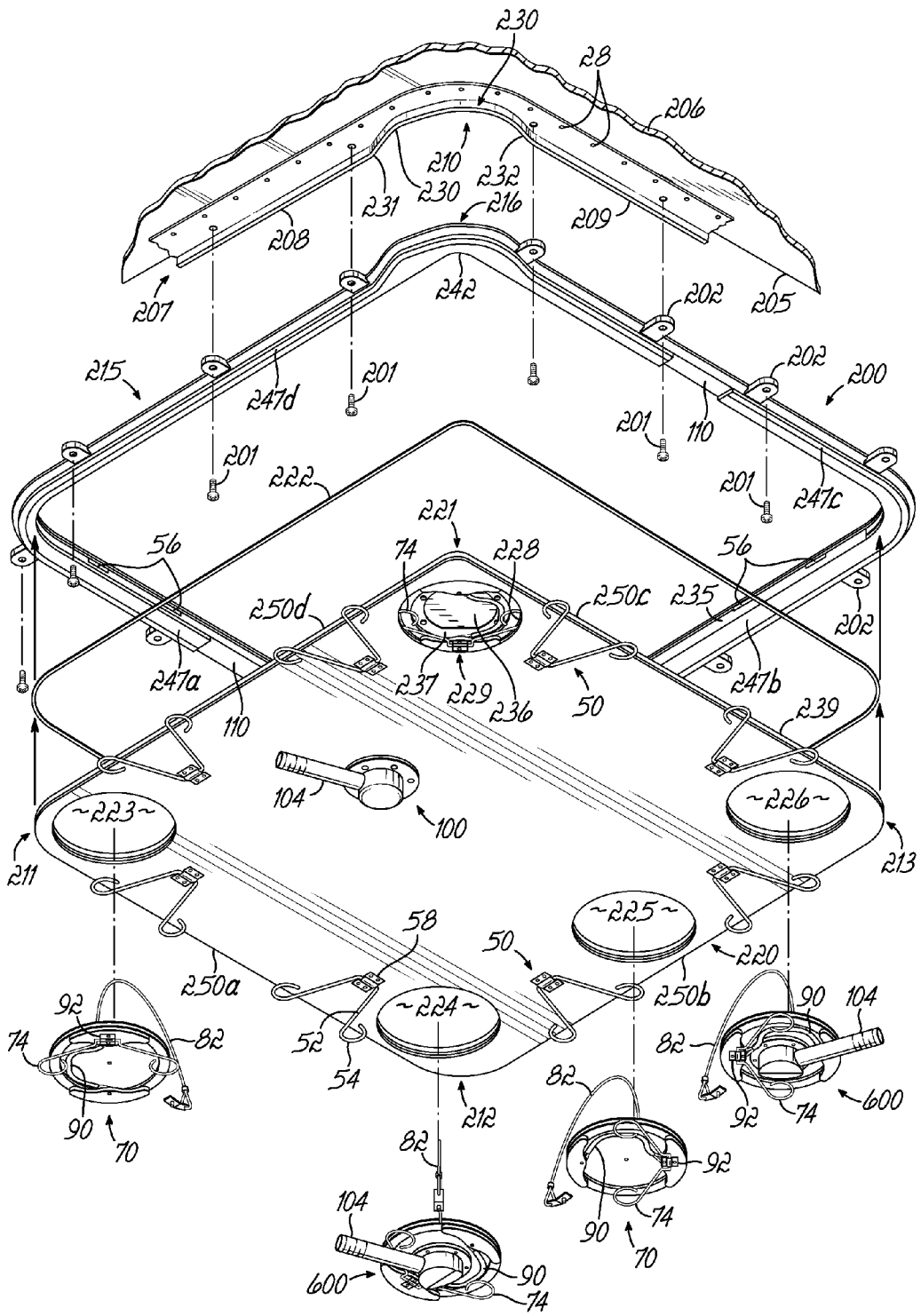
FIG. 2A is an exploded isometric view of components of a drip pan apparatus partially described in U.S. Publication No. 2009/0159739 (the '739 publication)
Figure 6:
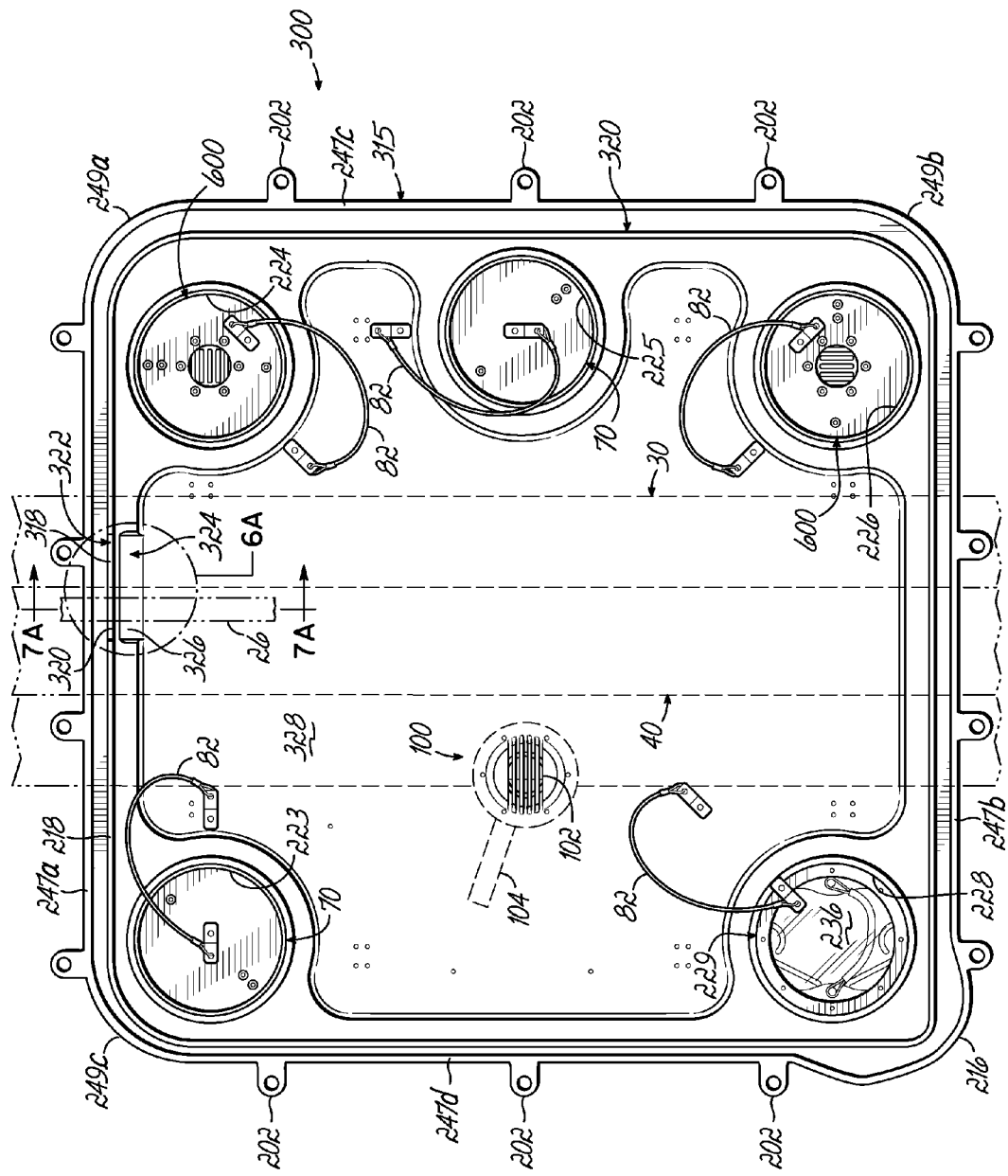
FIG. 6 is a top plan view of one embodiment of a drip pan apparatus when viewed from the transmission of the helicopter with a FRIES and a medevac bar shown in phantom line.

To address these and other issues, and with reference to FIGS. 6 and 7A in which like reference numerals refer to like portions of FIG. 2A, an improved drip pan apparatus 300 includes a frame 315, a pan 320, and a seal member, such as o-ring 222. In use, the frame 315 is secured to skirt 207 (shown in FIG. 7A) and has an inwardly-facing peripheral surface 335. The pan 320 has an outwardly-facing peripheral surface 339 which is spaced from the inwardly-facing peripheral surface 335. The seal member 222 contacts each of surfaces 335 and 339 to prevent fluid leakage between the pan 320 and frame 315.

As shown in FIG. 6, in one embodiment, the drip pan 320 defines one or more access ports 223-226 and a filter access port 228, which is provided with a removable port cover 229 having a view window 236. Once the drip pan 320 is secured to the frame 315, the status of a filter or other component in or on the transmission 16 (shown in FIG. 7A) may be viewed through the view window 236. Any one or more of the access covers 70 may be removed from its respective access port 223-226 such that routine maintenance and inspection of components within access opening 205 may be performed.

The drip pan 320 is inserted into the frame 315 in the position illustrated in FIGS. 6 and 7A, where seal member 222 creates a peripheral seal between the drip pan 320 and frame 315 and provides continuous sealing during airframe flexure and without the disadvantage of any face seal in this regard. Once the pan 320 is inserted into the frame 315, a drain line 104 may be connected to pass fluids from drain 100. However, according to one embodiment of the invention, the drip pan apparatus 300 may include one or more other drains as set forth in more detail below. The pan 320 may be secured in sealing engagement with the frame 315 by operation of a plurality of resilient members 50 as is shown in FIG. 2A. Each resilient member 50 having elongated arms 52 with curved portions 54. Resilient members 50 are free to pivot about brackets 58. Curved portions 54 selectively engage slots 56 opening toward and located about the interior periphery of frame 315.

The drip pan apparatus 300 may differ from that pan apparatus of the '739 publication in the area 6A shown in FIG. 6. As set forth above, the pan structure 27 does pinch and the drip pan apparatus 200 may pinch or otherwise push the wire bundle 26 into contact with the transmission 16. In one embodiment, the drip pan apparatus 300 includes a discontinuous edge structure that accommodates the wire bundle 26 proximate thereto such that the wire bundle 26 may not detrimentally contact the drip pan apparatus 300. By way of example, the discontinuous edge structure may include a rib along the peripheral edge of the pan 320 that is interrupted by a groove. The groove may provide a relief area for the wire bundle 26. The discontinuous edge structure, however, may not compromise the structural integrity of the drip pan apparatus.

Figure 6A:
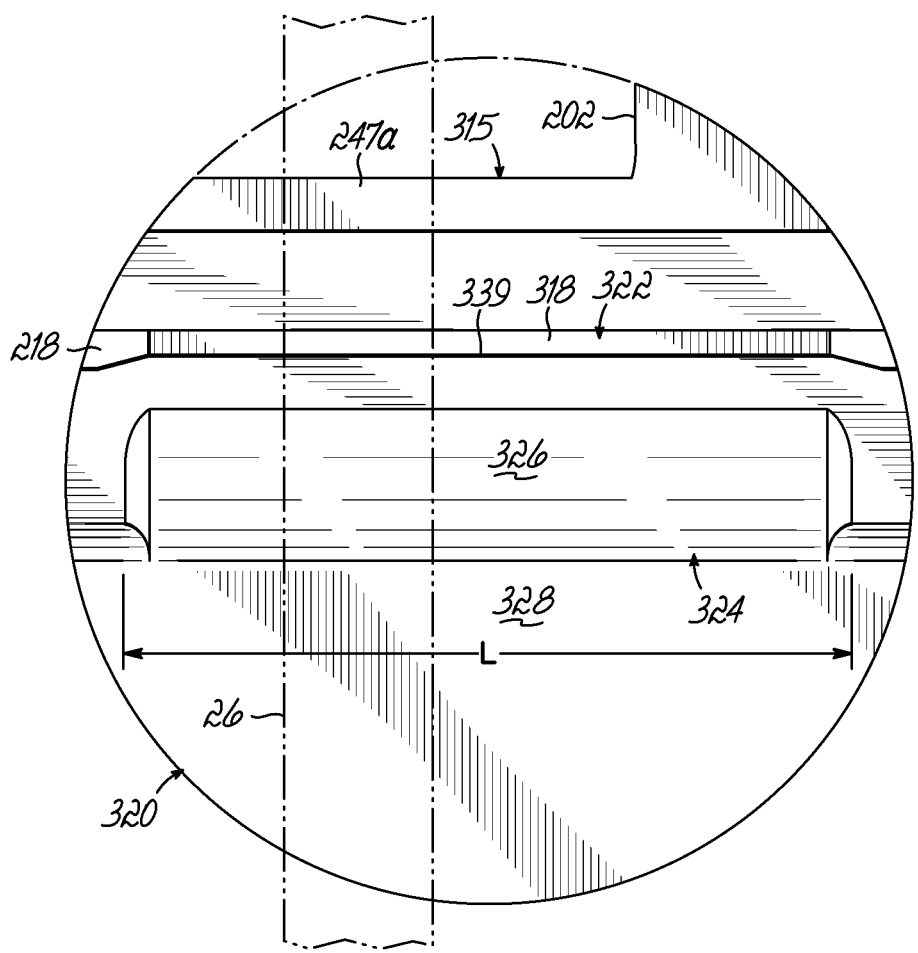
FIG. 6A is an enlarged view of the encircled area 6A of FIG. 6.

By way of further example, in one embodiment of the invention and with reference to FIGS. 6, 6A, and 7A, a recess 322 may be formed in the frame 315. Unexpectedly, such a recess 322 may not compromise the structural integrity or sealability of the frame 315. The recess 322 may define an inner rim 318 that is comparatively further from the transmission 16 and that may result in a thickness $T_1$ of the frame 315 along the recess 322 that is less than at an inner rim 218 adjacent the recess 322 and labeled $T_2$. Furthermore, the recess 322 may extend over a limited length L along a rail 247a without comprising the structural integrity of the drip pan apparatus 300. It will be appreciated that although the recess 322 is shown as a flat surface that is generally parallel to, for example, an elongated recess 110, the configuration of the recess 322 is not so limited. Other configurations may include a taper or chamfer along a limited portion or along the entire length of the rail 247a in this region. Furthermore, while shown, it is not necessary that the recess 322 expose a portion of the outwardly-facing peripheral surface 339 of the pan 320. In this regard, the thickness $T_1$ may be greater than that shown such that the surface 339 remains covered by the inner rim 318.

In addition or as an alternative to the recess 322, and with continued reference to FIGS. 6, 6A, and 7A, the pan 320 may include a recessed portion 324 along the periphery thereof and may substantially align with the recess 322. By way of example only, the recessed portion 324 may include a tapered surface 326 that extends from a pan base surface 328 to the periphery of the pan 320 at or near the outwardly-facing peripheral surface 339. As such, the pan 320 may be thinner at or in regions near the outwardly-facing peripheral surface 339 in area 6A of FIG. 6 than in regions proximate the recess 322.

It will be appreciated that while both the recess 322 and recessed portion 324 are collectively shown and described in the frame 315 and pan 320 in FIGS. 6, 6A, and 7A, the pan 220 shown in FIG. 2 may be secured to the frame 315. Similarly, the exemplary pan 320 having recessed portion 324 shown in FIG. 6 may be secured to the frame 215 shown in FIG. 2. In other words, it may be sufficient to alleviate pinching or provide clearance for the wire bundle 26 by use one of the frame 315 or the pan 320 or both the frame 315 and the pan 320 as either may provide additional clearance for the wire bundle 26. It will also be appreciated that this may be accomplished without moving (i.e., lowering) either of the frame 315 or the pan 320 toward the mission critical equipment, e.g., the medevac bar 40, and without causing the frame 315 or the pan 320 to protrude into the cabin 12.

In this regard, the improvement in the clearance between the drip pan apparatus 300 and the transmission 16, while measured in thousandths of an inch or fractions thereof, may be sufficient to avoid contact with the wire bundle 26 when the drip pan apparatus 300 is installed and during operation of the helicopter 10. By way of example, the improvement in clearance between the transmission 16 and the drip pan apparatus 300 may be measured perpendicular to the airframe member 206 to a plane that includes the inner rim 318 of the frame 315. In the exemplary configuration shown in FIG. 7A, the recess 322 may increase clearance by between about 0.0500 of an inch and 0.1500 of an inch, and by way of further example, by between about 0.0800 of an inch and 0.1400 of an inch. By comparison of the drip pan apparatus 200 of FIG. 4 with FIG. 7A, there may be an improvement in clearance or space between the wire bundle 26 and the frame 315. By comparison of the prior pan 27 of FIG. 5 with FIG. 7A, the interference fit shown in FIG. 5 may be eliminated.

In one embodiment and with reference to FIG. 7B, a drip pan apparatus 400 may include a frame 415, a pan 420, and the seal member 222. In comparison with the drip pan apparatus 300 shown in FIG. 7A, the frame 415 may be narrower in width $W_{13}$ along the length L shown in location 6A of FIG. 6 when compared to the width $W_{12}$ of the frame 315 shown in FIG. 7A and/or narrow in width when compared to the width $W_5$ shown in FIG. 2B. Accordingly, the location of the inwardly-facing peripheral surface 435 and the outwardly-facing peripheral surface 439 may be moved toward the skirt 207 as indicated by the arrow 440 in FIG. 7B as compared to the location of the inwardly- and outwardly-facing surfaces 335, 339 relative to the skirt 207 shown in FIG. 7A. Thus, the inner rim 318 shown in FIG. 7B is moved toward the skirt 207 and, consequently, away from the wire bundle 26 and transmission 16.

Figure 2B:
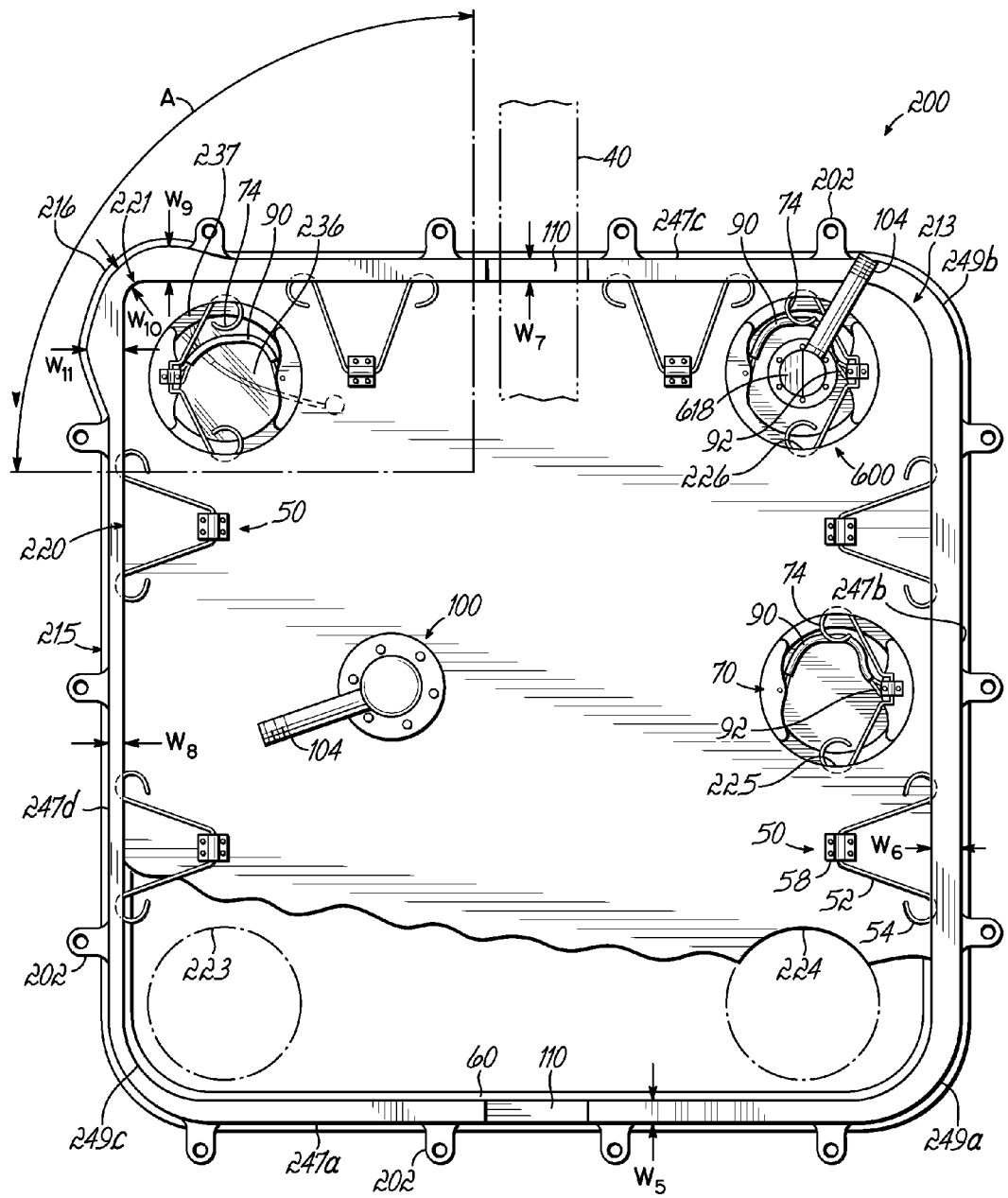
FIG. 2B is a plan view of components of the drip pan apparatus shown in FIG. 2A when viewed from the cabin of the helicopter.

Further in this regard and with reference to FIGS. 2B, 7A, and 7B, the width $W_{13}$ may represent the width of a rail 447a along the entire length thereof. Thus, the width $W_{13}$ may be less than the width $W_5$ of rail 247a labeled in FIG. 2B or less than width $W_{12}$ as labeled in FIG. 7A. It will be appreciated that the remaining widths of rails 247b, 247c, and 247d (shown in FIG. 2B) may be unchanged such that overall the pan 420 is larger than pan 320 or pan 220. Alternatively, by way of example, the dimensions of the pan 420, 320, and 220 may be comparable, but the widths of the rails 247b, 247c, 247d may be adjusted to account for width $W_{13}$ such that any of pans 320, 220 may be sealingly engaged with the frame 415. As such, it will be appreciated that while the frame 415 and pan 420 are shown together in FIG. 7B, embodiments of the present invention are not so limited, as the frame 415 may sealingly engage with the pan 220 (FIGS. 2A and 2B) or the pan 320 (FIG. 6). In addition to movement of the surfaces 435 and 439 toward the skirt 207 as compared to surfaces 335, 339, the frame 415 and/or the pan 420 may include recess 322 or recessed portion 324, as set forth above. As such, one or both of the recess 322 and recessed portion 324 may be used in combination with the width $W_{13}$ of rail 447a, i.e., the position of the surfaces 435, 439 relative to the skirt 207 to improve clearance between the transmission 16 and the nearest surface of the drip pan apparatus 400.

Figure 8:
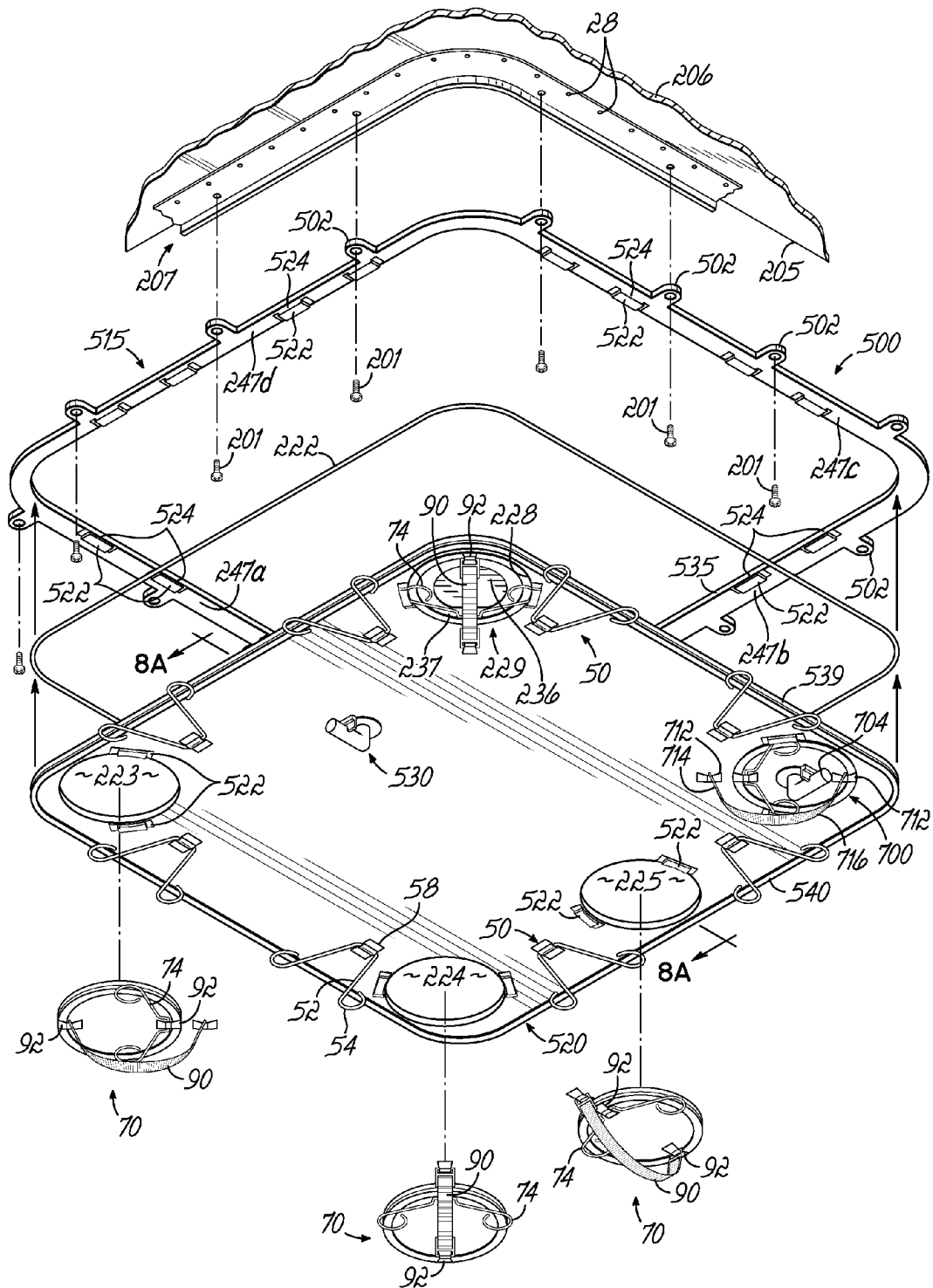
FIG. 8 is an exploded isometric view of a drip pan apparatus according to another embodiment of the invention.

In one embodiment and with reference to FIG. 8 in which like reference numerals refer to like portions shown in FIGS. 2A and 2B, a drip pan apparatus 500 may include a frame 515, a pan 520, and the seal member 222. The drip pan apparatus 500 is adapted to cover and seal access opening 205 of the helicopter 10 and thereby prevent fluid drippings from engine 14, transmission 16, or other fluids from passing through access opening 205.

To that end and with reference to FIGS. 8, 8A, and 8B, the frame 515 may be generally planar having tabs 502 for attachment to the skirt 207. The frame 515 has an inwardly-facing peripheral surface 535 to which the seal member 222 engages during use of the apparatus 500. While the inwardly-facing peripheral surface 535 is shown as a substantially flat surface, it will be appreciated that the frame 515 is not limited thereto as there are other configurations which may be used for engaging the seal member 222.

With continued reference to FIGS. 8 and 8A, the pan 520 may also be substantially planar. That is, pan 520 may be defined predominately by a plane of uniform thickness, though the pan 520 may have features that protrude above and/or below an otherwise uniform plane. The pan 520 has an outwardly-facing peripheral surface 539. Additionally, the drip pan 520 may define a plurality of access ports 223-226 and a filter access port 228, as described above. Any one or more of the access covers 70 may be removed from its respective access port 223-226 such that routine maintenance and inspection of the transmission 16 or other components within access opening 205 may be performed.

In one embodiment and with reference to FIGS. 8A-8C, the pan 520 includes an outer or bottom flange 540 that may radially extend beyond the outwardly-facing peripheral surface 539 of a core member 542. The bottom flange 540 may be secured to the core member 542 on the cabin side thereof. As such, the flange 540 may function as a stop during insertion of the pan 520 into frame 515. Also shown, in one embodiment, the pan 520 may include a top flange 544 that may also extend radially beyond the surface 539 and may oppose the bottom flange 540. As with the bottom flange 540, the top flange 544 may be secured to core member 542 though embodiments of the invention are not limited thereto. For example, top flange 544 may be secured to the frame 515 and extend radially inward over inwardly-facing surface 535. Together, as shown best in FIG. 8B, the bottom and top flanges 540, 544 may define a recess 546 therebetween. The recess 546 may be configured to receive seal member 222. One or both of the bottom and top flanges 540, 544 may retain the seal member 222 in contact with the surface 539 by limiting or restricting sliding movement of the member 222 along the surface 539 during installation, use, or removal of the pan 515 from the frame 520.

In addition, in one embodiment, an o-ring stop 548 may also define recess 546. In particular, the o-ring stop 548 may be positioned in direct contact with the bottom flange 540. The o-ring stop 548 may be adhesively secured to both the core member 542 and the bottom flange 540. Consequently, when the pan 520 is inserted into the frame 515 and the bottom flange 540 abuts the frame 515, the o-ring stop 548 may carry or spread any load generated by the contact of the flange 540 with the frame 515 over a larger area provided by the stop 548. The stop 548 may thus help resist bending or peeling off of the flange 540 during installation of the pan 520. In one embodiment, a lubricant may be used on the seal member 222 and/or on surfaces 535 and/or 539 to install the pan 520 in the frame 515.

In an alternative embodiment and with reference to FIG. 8C, in lieu of the top flange 544, the outwardly-facing peripheral surface 539 may define the recess 546. However, by this configuration, the recess 546 may perform substantially the same as the configuration shown in FIG. 8B though, as is described in detail below, the method of making the exemplary configurations may differ.

With reference to FIGS. 8 and 8A, in one embodiment, the drip pan apparatus 500 may further include a drain 530 which functions in a similar manner as the drain 100 of FIG. 2A and described in the '739 publication. Once the pan 520 is installed into the frame 515, a drain tube 106 (shown in FIG. 3B) may be connected to pass fluids from drain 530 to a location outside of the cabin 12.

Similar to embodiments described above and with reference to FIGS. 8 and 9, the frame 515 cooperates with the skirt 207 to cover access opening 205. And, once the frame 515 is installed on the skirt 207 and the pan 520 is inserted into frame 515, the apparatus 500 prevents fluid drippings from entering the cabin 12 of the helicopter 10. In this respect, the outwardly-facing peripheral surface 539 may be spaced from the inwardly-facing peripheral surface 535 by the seal member 222 when the pan 520 is installed in the frame 515. The seal member 222 forms a fluid-tight seal with both the frame 515 and the pan 520.

Figure 9:
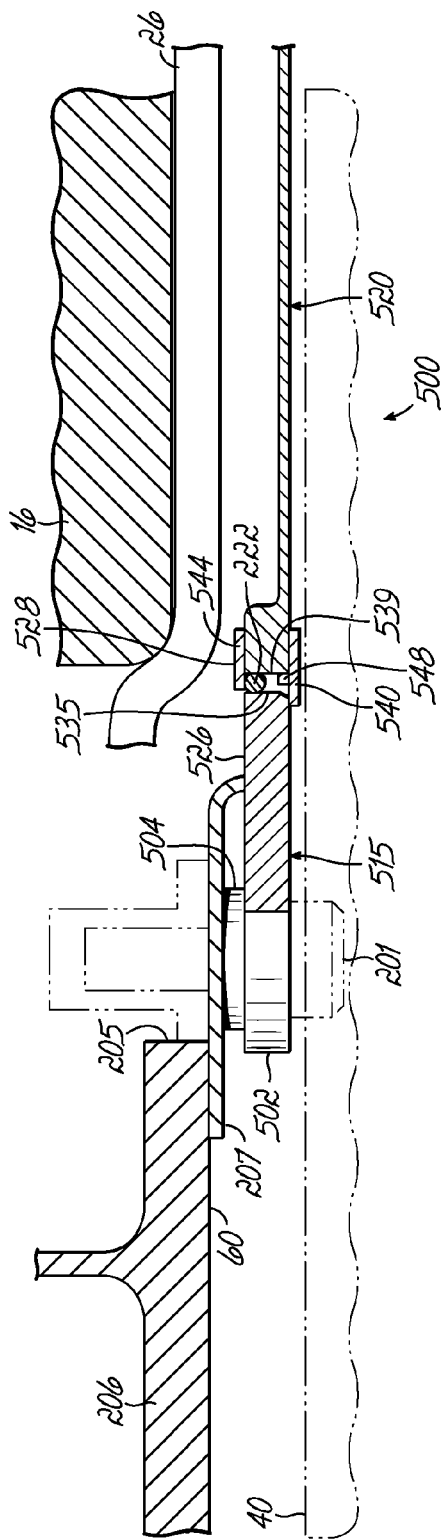
FIG. 9 is a cross-sectional view of one embodiment of the invention taken along a section line representative of the section line 7A-7A of FIG. 6 of the embodiment of the drip pan apparatus depicted in FIG. 8.

To that end and with reference to FIG. 9, fasteners 201 may secure the frame 515 to the skirt 207 through tabs 502. In one embodiment, a washer 504 may be positioned between the frame 515 and the skirt 207, and fasteners 201 may pass through each to secure the frame 515 to the skirt 207. A flexible sealing media (not shown), such as PROSEAL™ (manufactured by PRC Desoto International, Inc. of Indianapolis, Ind., a PPG Company) or other sealant may be used to seal the frame 515 to skirt 207. Accordingly, during installation, a bead of the flexible sealing media may be placed on the J-shaped rim of the skirt 207 and the frame 515 may then be pushed thereon to squeeze the flexible sealing media between the skirt 207 and frame 515. The flexible sealing media may be displaced to one or both sides of the skirt 207 and in contact with the frame 515. Alternatively or in addition to the above-described location, the flexible sealing media may be applied between the skirt 207 and the frame 515 at other locations. However, it will be appreciated that embodiments of the present invention are not limited to the particular location of any sealant between the frame 515 and the skirt 207. Thereafter, drip pan 520 is inserted into the frame 515 where seal member 222 creates a peripheral seal between the drip pan 520 and frame 515 and provides continuous sealing during airframe flexure and without the disadvantage of a face seal.

In one embodiment and with reference to FIG. 8, the frame 515 may have clips 522 defining slots 524 when attached to the frame 515. Attachment members 50 similar to those disclosed in the '739 publication releasably secure the drip pan 520 to the frame 515. Elongated arms 52 with curved portions 54 selectively engage the clips 522 via slots 524. In one embodiment, the clips 522 are located at or flush with the inwardly-facing peripheral surface 535 or less than about 0.25 of an inch measured perpendicularly therefrom. By this configuration, the curved portions 54 are captured by the clips 522 at a location that is closer to the junction between the outwardly-facing peripheral surface 539 and the inwardly-facing peripheral surface 535. Thus, the position of the clips 522 relative to the junction of the surfaces 535, 539 limits the flexibility or reduces relative movement between the frame 515 and the drip pan 520. Further in this regard, the clips 522 may be configured to resiliently deflect or bend as they are inserted into slots 524. By way of example, the clip 522 may be tapered to define a relatively large opening though the slot 524 may narrow in a direction away from the pan 520. As such, the curved portion 54 may be easily inserted into slot 524. However, upon further insertion of the curved portion 54, the arm 52 may bend, bow, or deflect as a result of the tapered clip 522 thereby increasing the force of contact between at least the clip 522 and the curved portion 54. It will be appreciated that an increase in force may translate into an increase in friction between the two components thus requiring a greater force for withdrawal of the curved portion 54 therefrom and may result in a more rigid arrangement as between the pan 520 and the frame 515.

In one embodiment, the drip pan apparatus 500 may be thinner than the drip pan apparatus 200, 300, and 400. By way of example and with reference to FIG. 9, the frame 515 may be up to about 50% thinner in similar locations as frame 315 or frame 415, and by way of additional example, may be between 10% and 50% thinner than the frame 215 (shown in FIG. 2A), the frame 315 (shown in FIG. 6), or 415 (shown in FIG. 7B) along the corresponding inner rim thereof. It will be appreciated that the frame 515 may be proportionally lighter than any of the frames 215, 315, or 415.

Further in this regard, the drip pan 520 may also be thinner than drip pans 220, 320, and/or 420. For instance, the relative decrease in the thickness may be up to about 50%, for example, in a central region of the drip pan 520 as compared to, for example, drip pan 220 and/or 320. By way of further example, the relative decrease in thickness may be at least about 10% compared to the drip pans 220 and 320. The weight savings may be significant. For example, the weight of the pan 520 may be up to about 50% less than that of the pan 320.

As shown in FIG. 9, as a result of the relative decrease in thickness, the drip pan apparatus 500 may allow the wire bundle 26 to fit within the space between the transmission 16 and the drip pan apparatus 500, though the clearance between mission specific equipment remains unchanged or is improved. In this regard, and by way of example, the drip pan apparatus 500 may be at most about 0.5000 of an inch thick through the thickest portion thereof. However, it will be appreciated that the thickest portion thereof may be between about 0.3000 inches and about 0.4000 inches, or by way of further example between about 0.3200 inches and about 0.3800 inches. However, the drip pan apparatus 500 may not impede or interfere with installation of mission specific equipment, such as the medevac bar 40, the FRIES 30, or a troop seat bar (not shown).

Accordingly, in view of the space constraints, relative positions of the wire bundle 26 and transmission 16, and prevention of the fluid leakage into the cabin 12, the drip pan apparatus 500 provides for at least the same clearance or spacing for the mission specific equipment as drip pan apparatuses 200, 300, and 400. Furthermore, the drip pan apparatus 500 may increase the distance from the apparatus 500 to the transmission 16. Consequently, more room may be provided therebetween such that the wire bundle 26 may not contact the drip pan apparatus 500 which may, in turn, reduce or eliminate chafing of the wire bundle 26 and transmission 16. In this respect, the wire bundle 26 may not be forcibly pinched between the drip pan apparatus 500 and the transmission 16 to a degree where detrimental chafing of the bundle 26 and/or the transmission 16 results. In one embodiment, while the apparatus 500 may increase the space available between the transmission 16 and the pan 520, the apparatus 500 provides the same or more headroom in the cabin 12. Thus, pan 520 may be more easily removed due to more clearance between the apparatus 500 and any special mission equipment.

For example and with reference to FIG. 9, the perpendicular distance from the bottom surface of the airframe member 206 at location 60 on which the skirt 207 is attached to the plane of the inner rim 526 of the frame 515 may be between about 0.1500 of an inch and about 0.2000 of an inch, and by way of further example the perpendicular distance may be between about 0.1700 of an inch and about 0.2000 of an inch. The perpendicular distance from the bottom surface of airframe member 206 to a plane that includes the top surface of the drip pan 520 at the inner rim 528 of the pan 520 may be between about 0.1000 of an inch and about 0.1400 of an inch, and by way of further example, the distance may be between about 0.1100 of an inch and about 0.1300 of an inch.

By way of comparison, one embodiment of the drip pan apparatus 500 may provide an improvement in distance between the transmission 16 and the drip pan 520 of at least about 0.1845 of an inch with an increase in clearance being as high as about 0.2000 inches compared to other drip pans, for example the drip pan 27 shown in FIG. 5 which compresses the wire bundle 26 against the transmission 16.

With reference again to FIGS. 8 and 8A, in one embodiment, the drip pan apparatus 500 is constructed of a fiber-reinforced composite. The composite may include fibers bound in a matrix. It will be appreciated that the fibers may be woven in a cloth-like form or be randomly oriented in mat-like form. The fibers may be made of glass, carbon, or other material that may exhibit greater tensile strength than the matrix. The matrix may be a polymer, such as, an epoxy.

However, it will be appreciated that the composite is not limited thereto as other fibers and polymers are known.

By way of example only, the fiber-reinforced composite may be a carbon-fiber reinforced composite. Accordingly, in one embodiment, portions of the frame 515 and the drip pan 520 may be made from carbon-fiber reinforced composite, such as EP258 plain weave carbon fiber-reinforced composite sheet available from Barrday Composite Solutions of Millbury, Mass. However, non-fiber-reinforced components may be attached thereto. For example, the clips 522, while possibly being made of the same carbon fiber-reinforced composite as the frame 515 and/or the pan 520, may be made of metal or plastic, which may then be secured by adhesive or other means to the drip pan 520. In addition, the access covers 70 may be made of metal, such as aluminum, stainless steel, or titanium, or may be made of the same composite material as the pan 520, as is described in more detail below.

In one embodiment, one or both of the frame 515 and the drip pan 520 are made of a fiber-reinforced composite by a laminating process, described in detail below. In brief, according to an exemplary laminating process, the frame 515 and/or the drip pan 520 may be constructed by stacking or placing multiple sheets of the fiber-reinforced composite upon one another. The resulting stack may then be cured and machined to form the one or both of the frame 515 and the drip pan 520.

According to an exemplary process and with reference to FIGS. 10A-10D, the frame 515 and/or the drip pan 520 may include a stack 550 containing at least two sheets (individually labeled 552) of the fiber-reinforced composite. It will be appreciated that the number of sheets 552 of the fiber-reinforced composite needed to build up a frame and/or a drip pan is determined at least in part by the starting thickness of each sheet 552. By way of example, each sheet may be about 0.060 of an inch thick following curing. However, embodiments of the present invention are not limited to sheets of a particular thickness. Moreover, each sheet 552 in the stack 550 may be of the same or of a different thickness. For example, the frame 515 and/or the drip pan 520 may include from about 2 to about 60 sheets of the fiber-reinforced composite, each of substantially equivalent thickness. In one embodiment, the thickness of the frame 515 is equal to about 39 or about 40 sheets of carbon fiber-reinforced composite following curing. In one embodiment, the pan 520 has a minimum thickness equivalent to about 6 sheets of the carbon fiber-reinforced composite but is at least 40 sheets thick along a boarder or the periphery thereof. For example, the pan 520 may be about 39 or about 40 sheets thick within a region of about 2 inches extending from the outwardly-facing peripheral surface 539 toward the center of the pan 520. Although not shown, the pan 520 may be uniformly thick throughout.

As set forth briefly above, the frame 515 and/or the drip pan 520 may be made by a process that includes stacking sheets 552 of an uncured fiber-reinforced composite on one another. This uncured composite may be referred to as "B-stage" material. B-stage composite sheets may be hardenable with a subsequent treatment by which the composite becomes capable of bearing loads.

Figure 10A:
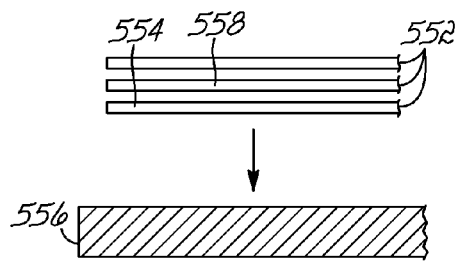
FIGS. 10A-10D illustrate a sequence of stacking sheets of a fiber-reinforced composite to form one or more of a drip pan, a frame, a port cover, and a drain port assembly according to one aspect of the invention.

With reference to FIG. 10A, in one embodiment, a base sheet 554 of B-stage carbon fiber-reinforced composite is placed on a support surface 556. Placing of a B-stage sheet may include pulling a predetermined amount of the composite sheet from a roll, cutting the sheet to the desired dimensions, and/or removing a release sheet from the composite sheet prior to actual placing of the sheet 554 on the surface 556. It will be appreciated that where B-stage carbon fiber-reinforced composites sheets are used to build the frame 515 and/or the pan 520, the support surface 556 may be clean and substantially free of contaminants that may later inhibit bonding of any components, such as, the brackets 58 and/or the clips 522 to the base or adjacent sheets. As shown, additional sheets of the fiber-reinforced composite may be placed on the base sheet 554 until a predetermined number of sheets or a particular thickness is reached.

Entrapped gasses from placing the sheets as well as volatile gases from the sheets may then be removed from the stack 550. Removal of entrapped gases may be referred to as "debulking." Debulking may improve or increase the contact between adjacent sheet surfaces and may improve the strength of the resulting component. Debulking of the B-stage stack may be completed at preset intervals during the laminating process and may result in a decrease in the overall thickness or height of the stack 550 from before to after debulking. For instance, debulking may be completed after each sheet is stacked onto the preceding sheet or may be completed after every other sheet. The timing of the debulking process may vary according to the number of sheets stacked and the position of those sheets on any preceding sheet.

Figure 10B:
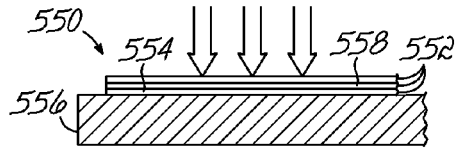

With reference to FIGS. 10A and 10B, while the stack 550 may contain at least two sheets, the stack 550 may be constructed of additional sheets prior to debulking. By way of example, after the base sheet 554 and a subsequent sheet 558 are stacked, the stack 550 may be debulked by rolling or compressing the stack 550 (indicated by arrows in FIG. 10B). In addition, or as an alternative to rolling, the stack 550 may be exposed to vacuum to facilitate removal of any entrapped gasses. In one embodiment, the stack 550 is placed in a vacuum bag (not shown) and a vacuum (e.g., of about 14 psi) may be pulled on the bag. The stack 550 is simultaneously rolled through the bag. By way of further example and as shown in FIG. 10A, three sheets 552 may be stacked prior to debulking.

Figure 10C:
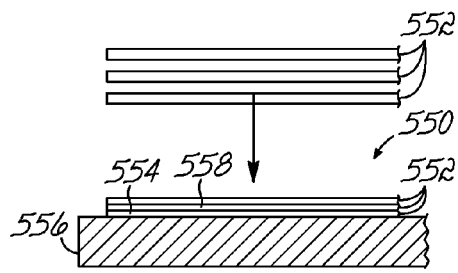
Figure 10D:
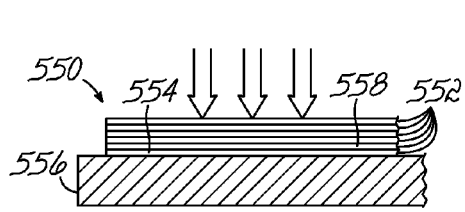

As shown in FIG. 10C, once debulked, additional sheets 552 may be added to the stack 550. The stack 550, including additional sheets 552, may again be debulked as described above. For example, where an initial stack contains three sheets and is debulked, as depicted in FIG. 10C, an additional three sheets may be placed on the debulked three-sheet stack. The six-sheet stack may then be debulked to form a debulked, six-sheet stack 550. Accordingly, the process may include iteratively placing the sheets followed by debulking until the final stack includes the predetermined number of sheets.

Figure 11A:
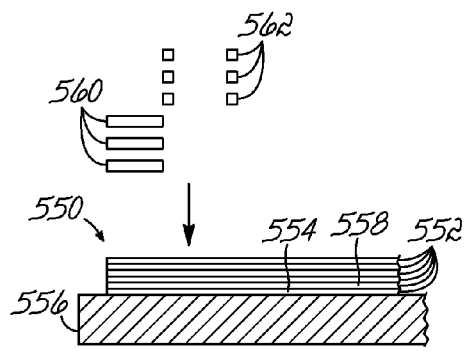
FIGS. 11A-11D illustrate a sequence of stacking sheets of a fiber-reinforced composite to form a drip pan apparatus according to one aspect of the invention.
Figure 11B:
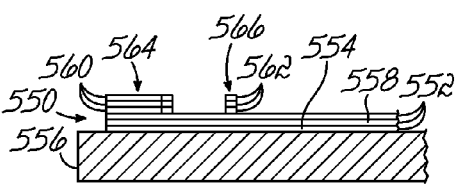
Figure 11C:
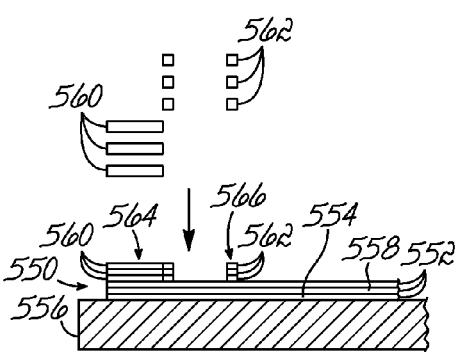
Figure 11D:
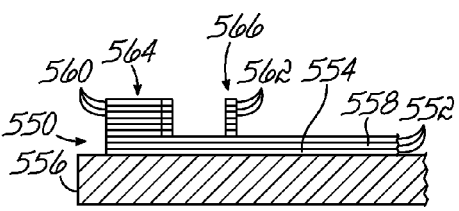

Additionally, with reference to FIGS. 11A-11D, in one embodiment, additional sheets of the fiber-reinforced composite may be cut to a predetermined shape prior to placing or stacking the sheet as set forth above. With reference to FIG. 11A, additional sheets 560 and/or 562 may be cut to a predetermined pattern different than the sheets 552. The sheets 552, 560, 562 may be cut with scissors or a razor, for example. As such, each layer of the stack 550 may have the same or different peripheral shape. By way of example, the pan 520 may be initially constructed by placing multiple sheets on the base sheet 554 having substantially the same peripheral shape. As is described above, the stack 550 may be debulked. Where, for example, the pan 520 is initially formed by a debulked stack of six sheets, additional sheets 560 and/or 562 may be precut in an annular configuration and then stacked on the stack 550. By this process, as depicted in FIGS. 11A-11D, a rim or border 564 may be formed on the initial six-sheet stack 550. Other borders 566 may also be constructed. The stack 550, including the borders 564, 566 may then be debulked. It will be appreciated that following debulking, the edges of the stack 550 may not be perpendicular, as shown, rather the edges of the stack 550 and the borders 564, 566, for example, may be tapered. The borders 564, 566 may, following curing and machining, define the surfaces 535, 539 and/or the access ports 223-226 or 228. A similar process may be used to separately construct the frame 515.

Once the stack 550 is of sufficient thickness or contains the predetermined number of sheets, it may be cured. Following curing, the composite may support mechanical loads. Curing of the debulked stack may take place by heating the stack to an elevated temperature. Depending on the fiber-reinforced composite composition, heating may occur in air or may occur in a controlled atmosphere. By way of example, a debulked B-stage stack of carbon fiber-reinforced composite sheets may be heated to a temperature in excess of about 300° F. in air, such as, to about 350° F. to cure the matrix. The heating process may take 24 hours and may require longer or shorter times depending on the number of sheets in the stack as well as other factors, for example, the composition of the matrix or the fiber. In one embodiment, the debulked stack is heated at about 5° F. per hour to about 350° F. followed by slow cooling from this temperature to room temperature.

Once cured, additional components may be secured, either via adhesive or other fastening means to the cured stack. As set forth above, the components may include the brackets 58 and/or the clips 522 for the drip pan 520 or the frame 515. The components may be secured prior to machining operations, as set forth below, particularly where coolants or lubricants that would contaminate the surface of the cured stack are used during the machining process. Securing the components prior to machining may improve the bond strength between the component and the cured composite.

In one embodiment, prior to adhesively joining the surface of the pan 520 or the frame 515 is roughened such that the fibers of the composite are exposed. The fibers may in some instances project from the surface. Various roughening processes may be used to expose and possibly cut the fibers, for instance, 40 grit sandpaper may be used to generate a localized roughened area prior to application of the adhesive and the component. The adhesive may therefore encapsulate the exposed ends of the individual fibers. When cured, the adhesive bond may include a mechanical-type bond between the exposed fibers and the cure adhesive.

However, in one embodiment, the components, for example the clips 522 and/or the brackets 58 may be placed on the surface 556 prior to initial placement of the base sheet 554. In this regard, the support surface 556 may be configured to accurately position components relative to the cured stack. For example, the surface 556 may include depressions (not shown) or another means for registering the position of those components such that they are properly positioned on the pan 520 and/or frame 515 following curing and machining. By this procedure, the components may be bonded to the stack during the curing process and may not require any adhesive to bond the components thereto.

The cured stack may then be machined to form the sealing and other surfaces thereof. For example, a carbon-fiber composite drip pan 520 may be formed by machining the outwardly-facing peripheral surface 539 and a carbon-fiber composite frame 515 may be formed by machining the inwardly-facing peripheral surface 535 thereof. Other features of the frame 515 or pan 520 may be also be machined. Machining includes those processes whereby both portions of matrix and associated fibers are removed from the cured stack. By way of example, machining may include CNC machining and water-jet cutting processes. Water-jet cutting may include ejecting pressurized water from a nozzle. The water may be pressurized to about 80,000 psi, for example, and may carry an abrasive, such as, 150 grit garnet. With reference to FIG. 8B, the surfaces 535 and/or 539 may be cut with a water jet. And, for carbon fiber-reinforced composite materials, water jet machining captures the carbon material removed from the cured stack thereby reducing or eliminating the hazards associated with machining carbon fiber reinforced composites.

Subsequently, with continued reference to FIG. 8B, the flanges 540, 544 and o-ring stop 548 may be adhesively bonded to the core member 542 to form the pan 520. Alternatively, with reference to FIG. 8C, the recess 546 may be machined via a CNC process in the surface 539 and then the bottom flange 540 may be secured thereto to form the pan 520. A combination of water jet cutting and CNC machining may also be used to form the surfaces 535, 539 as well as other features of the frame 515 and/or the pan 520.

In one embodiment, the drip pan 520 and the frame 515 are constructed of a single stack of fiber-reinforced sheets. By way of example, both the drip pan 520 and the frame 515 may be made from a single stack of carbon fiber-reinforced composite sheets. The single stack may be built as set forth above and then each of the pan 520 and the frame 515 may be machined from that single stack. In this exemplary process, each individual sheet in the stack may be cut to a predetermined shape prior to placement as described above. In other words, each sheet may have the same or different peripheral shape. By varying the peripheral dimensions of each sheet, the cross sectional profile of the stack may be varied with relatively thick and relatively thin regions as is shown by way of example in FIGS. 11A-11D.

For example, the frame 515 and the border of the pan 520 may be built up to be the same number of sheets thick. The central portion of the pan 520, however, may be much thinner and require fewer sheets. In addition, other features, such as the access parts, may be formed by placing sheets having different peripheral shapes on a specific region of the stack 550. While the stacking process may begin with the cabin-facing portion of the drip pan apparatus 500 and end with the transmission-facing surface of the apparatus 500, it will be appreciated that the process described herein is not so limited. In other words, the pan 520 and/or frame 515 may be constructed by placing sheets that form the transmission-facing surface first and the cabin-facing surface last. In this embodiment, it may be necessary to first obtain a cast or mold (not shown) of the desired transmission-facing surface and place precut sheets accordingly. For example, the border of the pan 520 may be initially built by cutting annular rings of the B-stage sheets and then placing those annular rings on one another in a recess in the mold configured to form the border. Once the border region is stacked and debulked, if necessary, the remaining sheets of the pan 520 that are to form the cabin-facing side of the pan 520 may be cut and placed on the annular ring. This portion of the pan 520 may be supported by a raised portion of the mold surface. However, once the stack 550 is cured, the frame 515 and the pan 520 may be machined from the single sheet.

With reference to FIGS. 12A-12F, in this embodiment, the water-jet cutting process may be used to cut the cured stack. To that end, one or more pilot holes 568 may be drilled through the cured sheet. The water jet cutting process may then begin at the pilot hole and be directed in a predetermined direction to cut the cured stack substantially perpendicular to the outer surfaces thereof to form the pan 520 and frame 515.

Figure 12A:
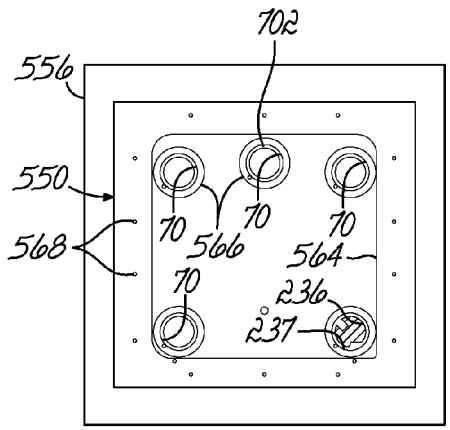
FIGS. 12A-12F illustrate a sequence of machining a drip pan apparatus from a single stack of sheets of fiber-reinforced composite according to one aspect of the invention.
Figure 12B:
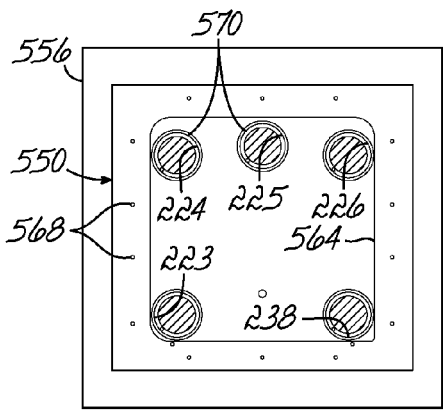
Figure 12C:
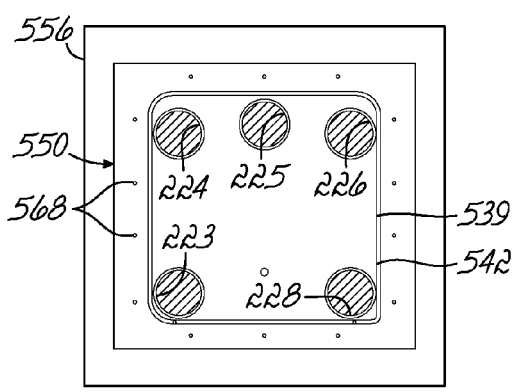
Figure 12D:
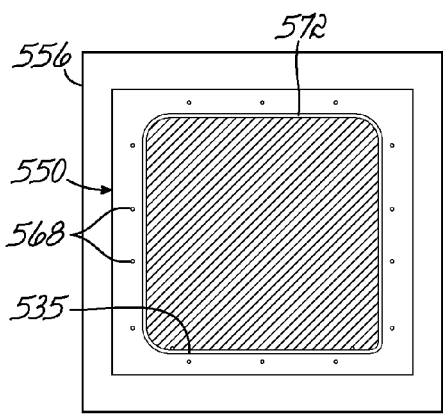
Figure 12E:
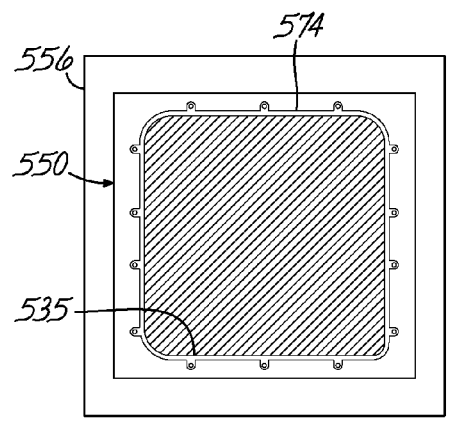
Figure 12F:
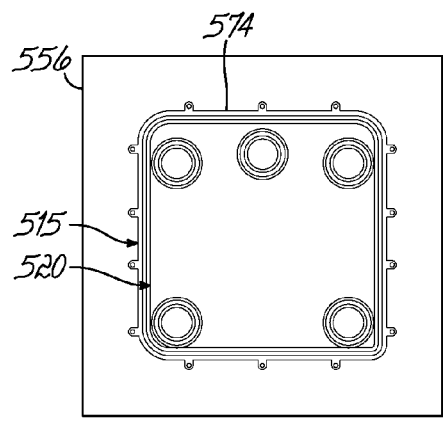

Specifically, with reference to FIGS. 12A-12F, in one embodiment, the machining process may include drilling of the pilot holes 568, then water jet cutting the covers 70, view window 236, frame 237, and access ports 223-226 and 228 from the corresponding pilot hole 568. A donut-shaped core 570 (FIG. 12B) may be formed during cutting of each of the access ports 223-226 and may be removed. With reference to FIG. 12C, the outwardly-facing peripheral surface 539 may then be cut from one or pilot holes 568. The core member 542 may then be removed. The inwardly-facing peripheral surface 535 may then be cut as depicted in FIG. 12D. A core 572 may be formed and may be removed. With reference to FIGS. 12E and 12F, the outer periphery 574 of the frame 515 may then be cut such that each of the frame 515, pan 520, and covers 70, as well as other features, are cut from the single cured stack. It will be appreciated that while a particular order for machining may be inferred from the above description, the order in which the machining is completed may be reversed or be made in any combination.

Because the water-jet process may produce a generally cone-shaped water jet, the nozzle or orifice of the water-jet machine may be tilted slightly. Slight tilting of the nozzle may provide a cut surface that is substantially perpendicular with the plane of the frame 515 and/or pan 520. It will be appreciated the frame 515 and/or pan 520 may be cut from the transmission-facing surface to the cabin-facing surface or vice versa. It will also be appreciated that machining the cured stack may include machining with both a water jet process and a CNC machining process. For instance, the surfaces 535, 539 may initially be cut via a water-jet process and then machined on a CNC machine. It will be appreciated that unlike a water-jet cutting process, which may cut the composite cross wise to form the surfaces 535, 539, the CNC machining process may be used to machine all or a portion of the surface 535, 539 longitudinally or with the surfaces 535, 539.

In one embodiment, additional sheets of the composite or another material may be secured or adhesively bonded to the cabin-facing side and the transmission-facing side of the machined stack 550 to form the frame 515 or pan 530. These additional sheets may form the bottom flange 540, the top flange 544, and/or the o-ring stop 548 of the pan 520. An exemplary adhesive includes Resinlab® EP 1238 epoxy adhesive, a two-part acrylic/epoxy hybrid adhesive commercially available from Ellsworth Adhesive Company of Germantown, Wis. The adhesive may wet the carbon fiber-reinforced composite and may have flexibility or resiliency when cyclically loaded. In one embodiment, shown in FIG. 8B, the adhesive forms a fillet 549 between the corresponding adhesively bonded components, such as, between the o-ring stop 548 and the outwardly-facing peripheral surface 539 and/or between the o-ring stop 548 and the bottom flange 540. As such, the adhesive may form a portion of the surface 539. In addition, carbon fiber-reinforced rivets (not shown) may be forced into holes machined in the bottom flange 540 and/or the top flange 544 and into the core member 542. A portion of the rivet may extend into the flange 540, 544 and the core member 542. The rivets may further strengthen the bond between the respective flange 540, 544 and the core member 542.

With reference to FIG. 9, the seal member 222 forms a fluid tight seal with the inwardly-facing and with outwardly-facing peripheral surfaces 535, 539. As is set forth in the embodiments above, one or both of these surfaces may be formed by machining the cured stack. In other words, the surfaces 535, 539 may not be as-formed surfaces. Rather, they may each be formed by removing both matrix material and fiber. As such, these surfaces 535, 539 may be rough when compared to a metal surface machined for the purpose of forming a fluid-tight seal. And, due to the nature of the composite, the roughness of the surfaces may not be capable of being reduced in a cost-effective and/or efficient process. The machined surface may therefore include exposed end portions of cut fibers.

In one embodiment, the surfaces 535, 539 do not receive any additional machining or treatment prior to installation of the apparatus 500 in the helicopter 10. By way of example, the roughness of the machined surfaces with which the seal member 222 contacts, e.g., the inwardly-facing and/or outwardly-facing peripheral surfaces 535, 539, may be at least about 16 micro-inches (rms) or at least about 32 micro-inches (rms) and, by way of further example, may be at least about 63 micro-inches (rms). By way of example and not limitation, the seal member 222 may have a durometer hardness of about 70 Shore A. However, even where one or both surfaces 535, 539 are cut as set forth above and are characterized by surface roughness higher, and in some case substantially higher, than that used to form fluid-tight seals with metal surfaces, once installed and in operation, the drip pan apparatus 500 seals the access opening 205 from uncontrolled fluid leakage therethrough. For example, surfaces 535, 539 in conjunction with seal member 222 substantially prevent leakage of fluid between the pan 520 and the frame 515. The seal formed may prevent fluid leakage when subject to a fluid pressure generated by hydraulic fluid of about 1 inch in depth on the drip pan 520. Furthermore, the seal formed may resist or prevent leakage while being subject to normal vibration during operation of the helicopter 10.

In an alternative embodiment, one or both of the frame 515 and the drip pan 520 are monolithic fiber-reinforced composites. In other words, the frame 515 and the drip pan 520 may be molded by vacuum molding or compression molding techniques in a mold (not shown). The mold may include a cavity generally defining the frame 515 or the drip pan 520. The fiber-reinforced composite may be placed in the mold and compressed or vacuum formed with or without heating to individually form a preform having a configuration of the frame 515 or the drip pan 520. Once formed, such a preform may be subject to a similar curing process as set out above. The formed and cured preform may then be machined. For example, the preform may be machined to form the outwardly-facing peripheral surface 539 or the inwardly-facing peripheral surface 535. By way of further example, it may be necessary to drill holes in the tabs 202 through which fasteners 201 may pass. The pan 520 and/or frame 515 may also be machined from a block of the composite. However, it will be appreciated that such processes may be characterized by a large amount of waste and a pan or frame of relatively poor strength.

As described above, routine maintenance and inspection of the rotor transmission 16, may not ordinarily require removal of the entire drip pan for any of the apparatuses 300, 400, or 500. As shown in FIGS. 2A and 2B, to accommodate limited access for routine maintenance or inspection, or filter replacement, removable access covers 70 are provided in drip pan 320, 420, or 520 to allow access through access ports 223, 224, 225, 226, 228 (collectively referred to herein as "access ports") to mechanical linkages in and around the rotor transmission and to allow inspection of the fluid levels associated with the rotor transmission 16.

To secure access cover 70 to the access ports in, for example, any of drip pans 220, 320, 420, and 520, each access cover 70 may have a resilient member 74 which functions much like resilient member 50 for securing the drip pans 220, 320, 420, and 520 to one or another of the frames 215, 315, 415, or 515. To facilitate the removal of access covers 70 from access ports, pull handles 90 may be attached to access covers 70. Fasteners 92 may fixedly secure pull handles 90 and/or members 74 to access covers 70.

As an alternative to the access cover 70 and with reference to FIGS. 2A, 13, 14, and 15 there is illustrated a drain port assembly 600. As is shown specifically in FIG. 2A, in one embodiment, the drain port assembly 600 may be removably disposed in sealing engagement within access ports 224 and 226. In this regard, it will be appreciated that the drain port assembly 600 may be removably disposed in all of, or a selected few of, the access ports disclosed herein.

Figure 3A:
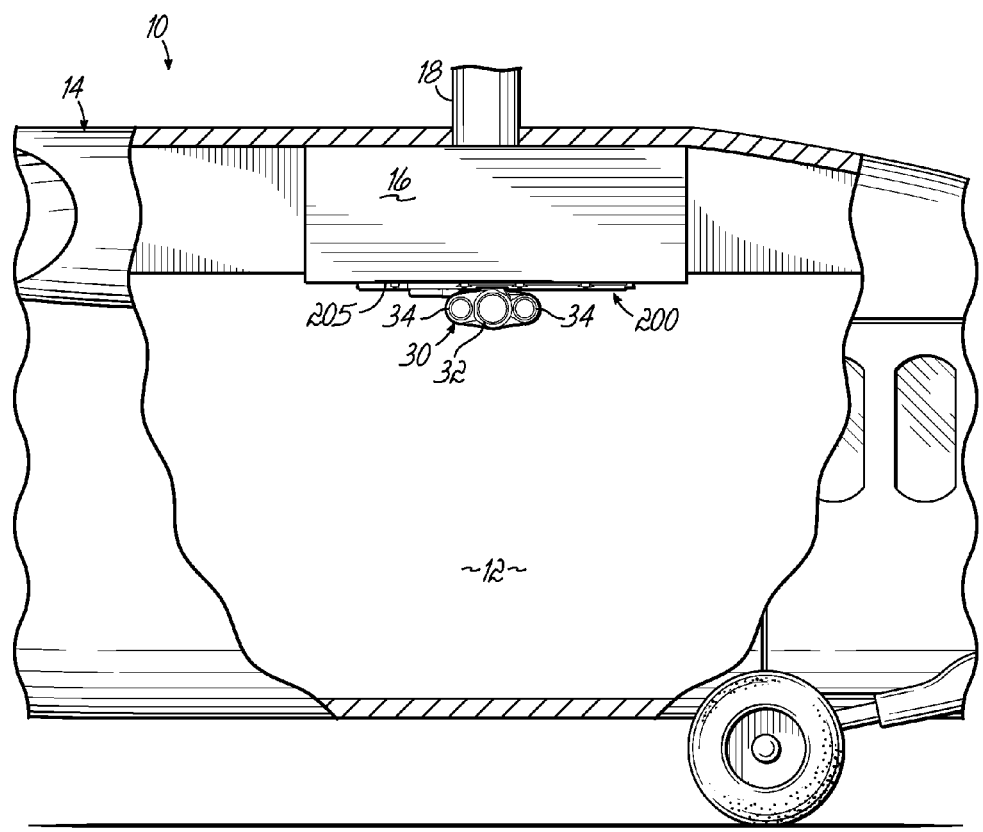
FIG. 3A is a side elevation view of the cabin section of a helicopter equipped with a FRIES.

With reference to FIG. 2A, ports 224 and 226 are generally positioned closest to the flight deck or cockpit and are thus generally located on the opposite side of the special operations equipment (e.g., the FRIES 30 or the medevac bar 40 shown in FIGS. 3A and 3B, respectively) from the drain line 104. This is best illustrated in FIG. 3B.

Figure 3B:
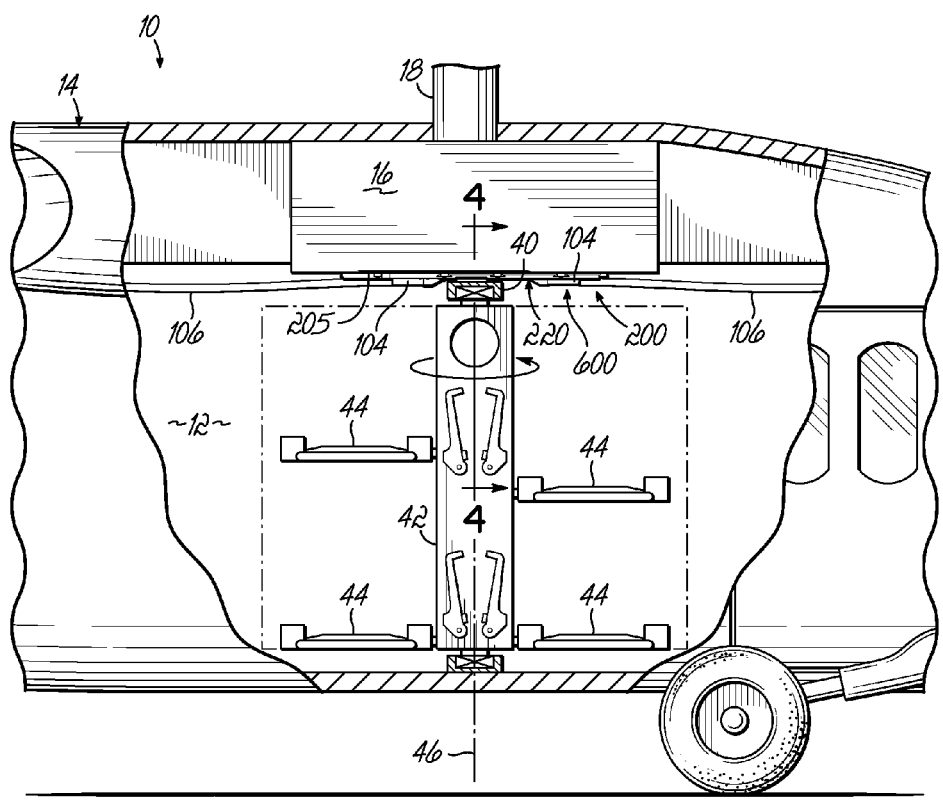
FIG. 3B is a side elevation view of the cabin section of a helicopter equipped as a medevac.

With reference to FIG. 3B, drain tubes 106 may be connected to each of the drain port assembly 600 as well as to the drain 100. The tubes 106 may divert fluids to another location, such as, outside of the cabin 12. Typically, to do so, the tubes 106 are secured to the ceiling of the cabin 12 at one or more locations other than to the drain line 104. As such, fluid that drips from the transmission 16 or from another location above cabin 12 may be provided with multiple pathways by which accumulation of fluid on the drip pan apparatus 200, 300, 400, or 500 may be minimized or avoided.

In prior pans, the existence of fixed drain lines on each side of the special operations equipment created problems with removal of the pan because the drain lines would interfere with sliding of the pan in either direction for maintenance purposes. Advantageously, the drain port assembly 600 allows additional drain ports to be added to the apparatus 200, 300, 400, 500 though the addition of a drain port does not interfere with the removal of the drip pan from the frame. Moreover, the drain port assembly 600 eliminates the necessity of disconnecting the drain tube 106 therefrom prior to removal of the pan.

For example and with reference to FIGS. 2A, 3B, according to one embodiment of the invention, the drip pan 220 may be removed from the frame 215 by initially removing each drain port assembly 600. Removal of the pan 220 may then proceed without first disconnecting the tube 106 from the drain port assembly 600. In this manner, once the drain port assembly 600 is removed, the drip pan 220 may be slid aft between the medevac bar 40 and the corresponding frame 215. The drip pan 220 may thus be completely removed to provide full access through opening 205. The removed drain port assemblies 600 may be allowed to hang or dangle from their respective tubes 106 during maintenance. As such, they remain attached to the helicopter 10, even when the associated pan is removed.

Figure 14:
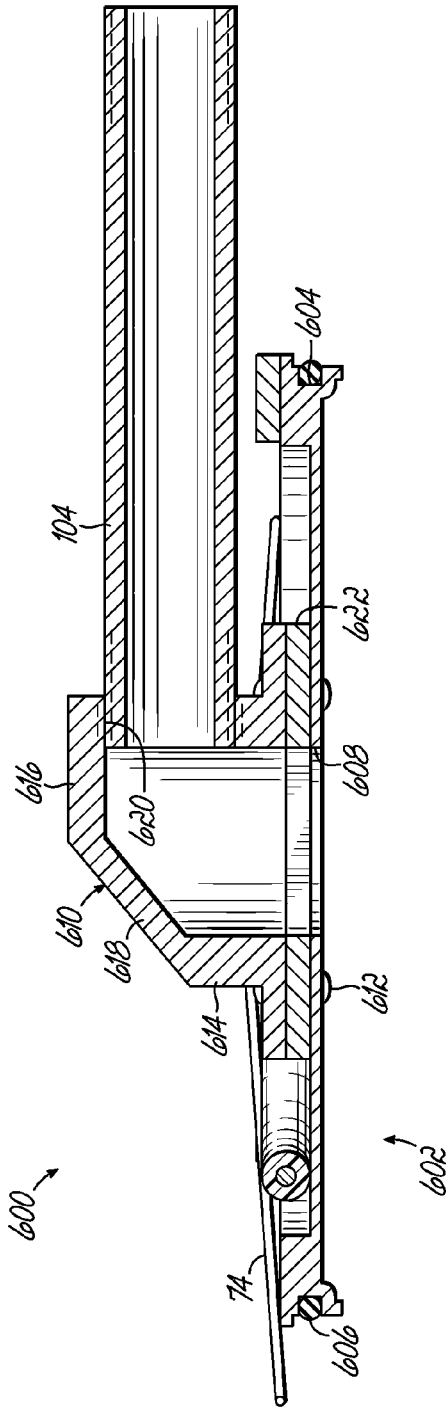
FIG. 14 is a cross-sectional view of a portion of the removable drain port assembly taken along section line 14-14 of FIG. 13.
Figure 13:
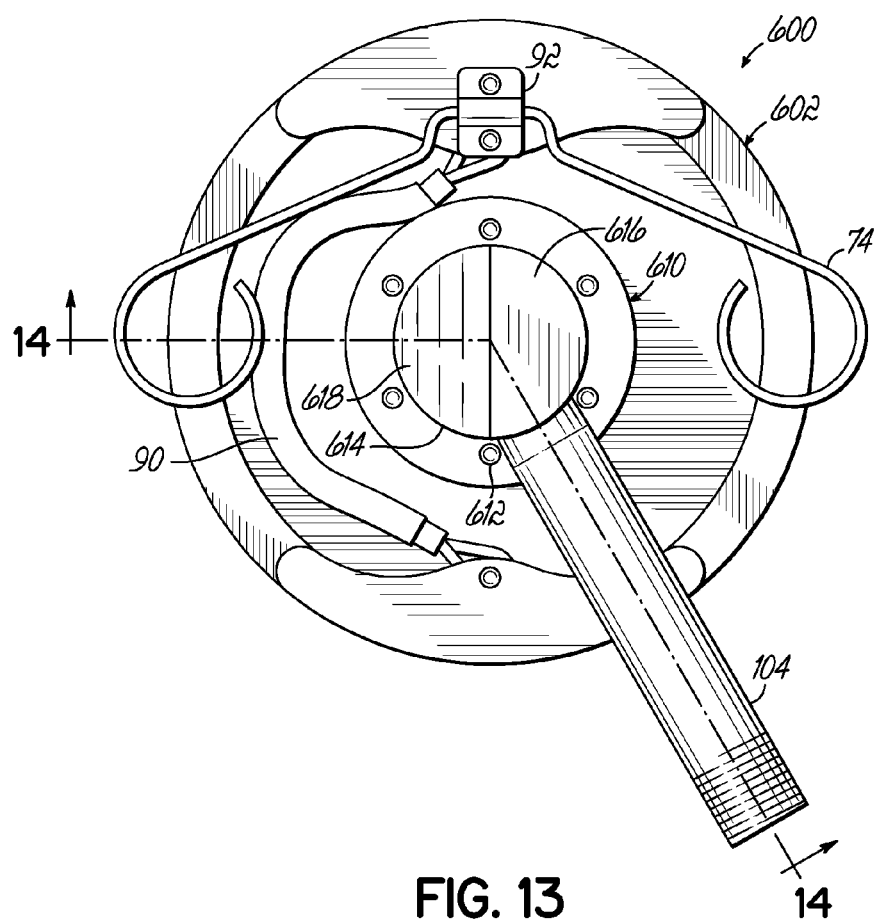
FIG. 13 is bottom plan view of one embodiment of a removable drain port assembly according to another aspect of the invention.
Figure 15:
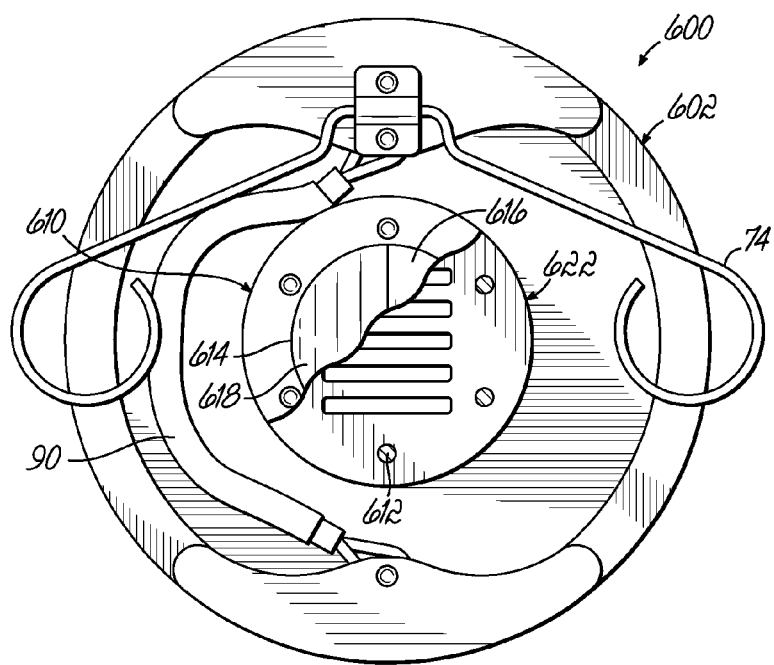
FIG. 15 is a bottom partially-cut-away plan view of one embodiment of a drain grate according to another aspect of the invention.

To that and other ends, and with reference now to FIGS. 13, 14, and 15, one embodiment of the drain port assembly 600 is shown and includes a port cover 602 that may have an annular groove 604 configured to receive a seal member 606 therein for sealing engagement with one of the access ports defined by a drip pan, described above. The port cover 602 defines an opening 608 therethrough. The assembly 600 further includes a drain cap 610, which may be integral with or secured to the port cover 602 by, for example, adhesive, sealant, and/or fasteners 612. The drain cap 610 may be generally configured with a hat-like cross-sectional shape, as shown. However, the cap 610 may be truncated or partially tapered along one side thereof. For example, the cap 610 may have a side wall 614 with an enclosed end 616. A slanted wall 618 may extend from the side wall 614. By way of example, the slanted wall 618 may intersect the enclosed end 616 at about 45 degrees. The side wall 614 may define a drain 620 to which the drain line 104 may be secured. It will be appreciated that drain 100, shown in FIG. 2A, may be configured with the drain cap 610 in place of the cap shown.

The drain cap 610 is generally aligned with the opening 608 whereby, when the assembly 600 is removably inserted into a drip pan, described above, fluids may be directed through the assembly 600 to a location outside of the cabin 12. It will be appreciated that the configuration of the cap 610 including the slanted wall 618 may be oriented within the cabin 12 to improve clearance therein. For example, the slanted wall 618 may allow more head room for personnel who are in the cabin 12 or the slanted wall 618 may be selectively positioned to face special operations equipment attached to the ceiling of the cabin 12 and provide more clearance therebetween.

In addition, in one embodiment as shown in FIGS. 14 and 15, the drain port assembly 600 may further include a grate 622. The grate 622 may reduce plugging of the tubes 106 by preventing relatively large debris from entering the corresponding drain line 104. With reference to FIG. 14, the grate 622 may be positioned on the cabin side (between the cap 610 and the cover 602) of the port cover 602. However, it will be appreciated that the grate 622 may be placed on the transmission side of the port cover 602. Other strainer-like configurations are possible including a strainer that is integral with the cap 610 or with the port cover 602.

Figure 16:
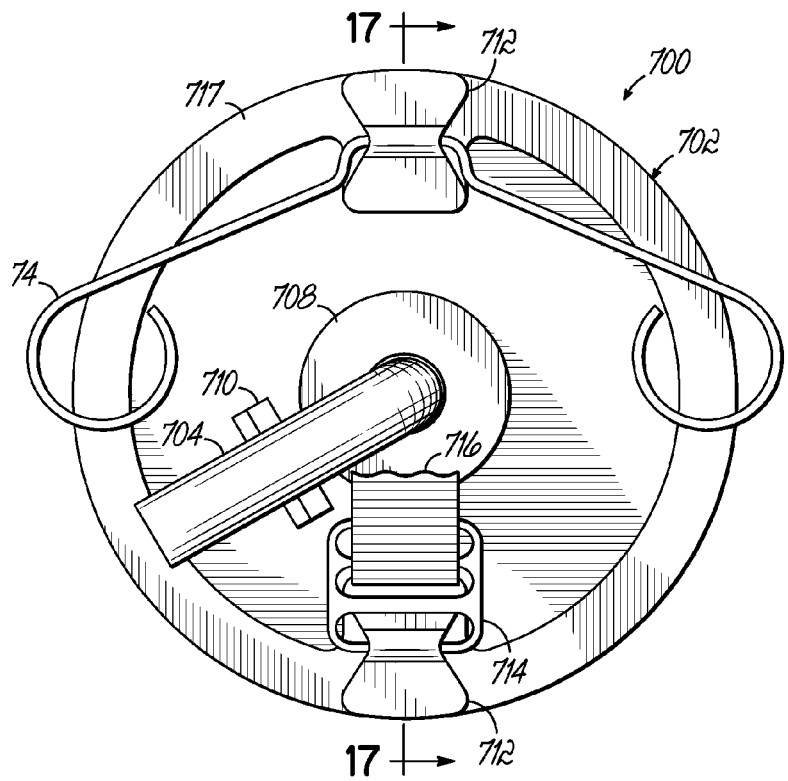
FIG. 16 is a bottom plan view of another embodiment of a removable drain port assembly.
Figure 17:
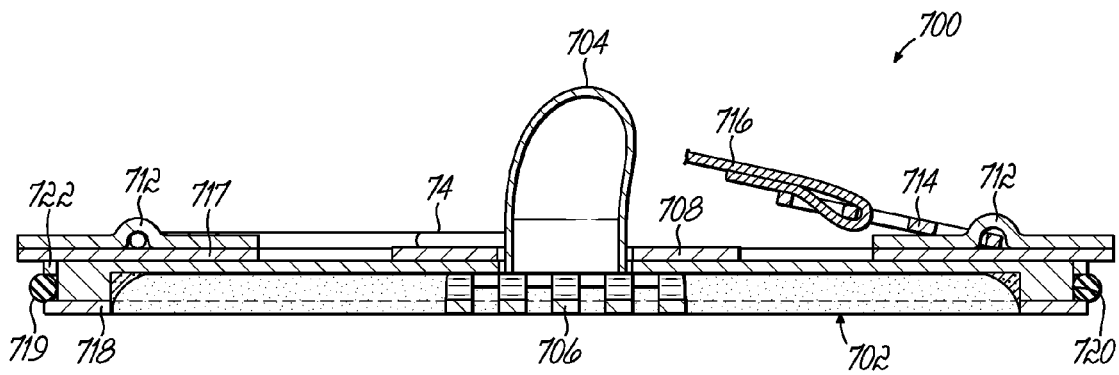
FIG. 17 is a cross-sectional view taken along section line 17-17 of the removable drain port assembly shown in FIG. 16.

With reference to FIGS. 16 and 17, in one embodiment of the invention, there is shown a drain port assembly 700. The drain port assembly 700 is configured to removably engage the access ports, similar to that of the drain port assembly 600. Resilient members 74 engage a recess formed in the corresponding access port to releasably secure the drain port assembly 700 to the drip pans 220, 320, or 420, or member 74 may releasably secure the assembly 700 to clips 522 for pan 520.

Similar in function to the drain port assembly 600, set forth above, the drain port assembly 700 includes a port cover 702. A drain pipe 704 may extend through the port cover 702 such that fluid passing through grating 706 may be directed away from the cabin 12 of the helicopter 10. When present, a drain washer 708 may surround and reinforce the port cover 702 in the vicinity of the drain pipe 704. A drain support 710 may extend between the port cover 702 and the drain pipe 704 to reinforce the drain pipe 704.

Assembly 700 may include clips 712 for securing resilient member 74 thereto. The clips 712 may alternatively secure a buckle 714 to the port cover 702. As shown in FIG. 8, the buckle 714 may releasably secure a pull handle or strap 716 to the assembly 700 at one end thereof. Another buckle 714 at the other end of the strap 716 may be secured to the drip pan 220, 320, 420, 520. As shown, placement of the buckle 714 may be near a peripheral edge of the port cover 702. Another buckle 714, also secured to the strap 716, may be attached to the associated pan in a position whereby the strap 716 generally crosses the port cover 702. This orientation of the strap 716, which crosses the assembly 700, may reduce the force needed to remove the assembly 700 from the pan 520. In addition, the relative, asymmetrical orientation of the clips 522 and the resilient members 74 assure that the relative orientation of the port cover 702 and the pan 520 will keep the assembly 700 oriented in this manner. In other words, the assembly 700 may be installed in the pan 520 in a single orientation. The configuration including the strap 716 may eliminate the need for both the pull handle 90 and the lanyard 82 (shown in FIG. 2A) thereby reducing the relative weight of the assembly 700, allowing easy replacement of the assembly 700 and/or strap 716, and keeping the port cover 702 attached to the pan when the port cover 702 is removed therefrom.

The port cover 702 further includes a port ring top 717 and a port ring bottom 718 that may partially define recess 720 adapted to receive a sealing member or o-ring 719. Recess 720 may also be partly defined by an o-ring stop 722 that is configured to increase the surface area for securing the port ring top 717 to the port cover 702.

In one embodiment, the port cover 702 may be made by a laminating process similar to that described above with regard to the drip pan apparatus 500. In this regard the port cover 702 may include a stack of at least two sheets of the fiber-reinforced composite. In one embodiment, the port cover 702 includes 6 sheets of a carbon fiber-reinforced composite, and the port cover 702 is made by a similar process as set forth above with regard to the drip pan 520 and/or frame 515. In this regard, the port cover 702 may be constructed by initially forming a stack of uncured fiber-reinforced composite sheets, for example, B-stage carbon fiber-reinforced composite sheets. As with the pan 520 and/or frame 515, a base sheet may be initially placed onto a support surface. Additional sheets may then be placed on the base sheet. The stack may be debulked, as set forth above.

Once the stack contains a predetermined number of sheets, it may be cured. Following curing, the clips 712 and/or buckles 714 may be attached thereto by appropriate adhesive as set forth above. The clips 712 and/or buckles 714 may also be made of the reinforced composite though they may be made of stainless steel, titanium, or titanium alloys. In one embodiment, the drain pipe 704 may also be made of the fiber-reinforced composite and may be adhesively secured to the port cover 702. In one embodiment, the cured stack may be machined. For example, the recess 720 may be machined from the cured stack.

In one embodiment, as set forth above with reference to FIGS. 12A-12B, the port cover 702 may be cut from the same cured stack as the pan 520. To this end, following curing of the stack 550 that is to form the pan 520, one or more of the port covers 702 for each access port 223, 224, 225, 226, 228 may be cut from the stack at a predetermined location. In this regard, two cuts may be required to cut the port cover 702 and the corresponding access port from the pan 520. One cut may be required to define the port cover 702 and an additional cut may form the corresponding access port. The two cuts may be spaced apart and thus form an annular ring of material that may then be removed. While two cuts are described, it will be appreciated that a single continuous cut that first forms the port cover 702 and then forms the corresponding access port is also contemplated. The distance between the cut surfaces may be about 0.100 of an inch though the distance may depend on the dimensions of the seal member that may be used to form a seal with the opposing surfaces.

In one embodiment, a pilot hole may be initially drilled through the cured stack. At set forth above with regard to FIGS. 12A-12F, the location of the pilot hole may correspond to be within the annular ring that remains once each of the port cover 702 and the access port is cut into the pan 520. A water-jet may then be used to cut the port cover 702 and the corresponding access port starting at the pilot hole. It will be appreciated that both surfaces with which an o-ring may form a seal are cut or machined surfaces. The surfaces formed by cutting may be rough, for example, at least about 16 micro-inches (rms) or at least about 32 micro-inches (rms) or more. Nevertheless, the o-ring may form a fluid tight seal with each such that when the assembly 700 is inserted into the corresponding access port, the seal member forms a fluid-tight seal therebetween. It will be appreciated that while the assembly 700 is described as being manufactured by a layering or stacking process, the assembly 700 may be machined from a single piece of the fiber-reinforced composite.

Figure 18:
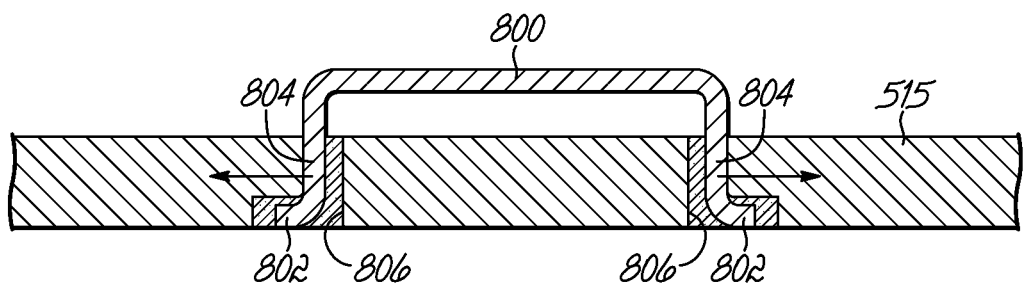
FIGS. 18, 19, and 20 are each cross-sectional views of exemplary embodiments of a bracket according to another aspect of the invention.
Figure 19:
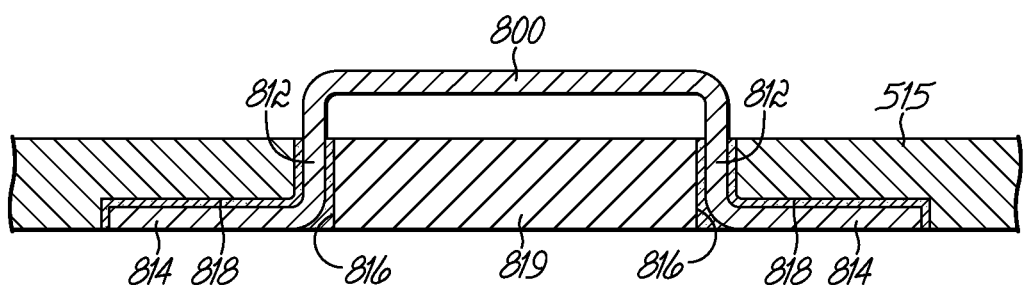
Figure 20:
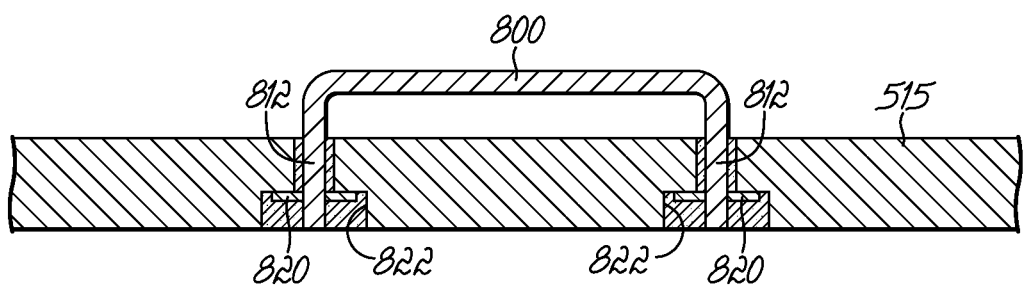

With reference now to FIGS. 18-20, alternative embodiments for attachment of other components to one or all of the frame 515, pan 520, and port cover 702 are shown. It is known that attachment of components by adhesive bonding or fasteners to cured fiber-reinforced composite materials may be result in relatively low bond strength. This may be particularly true when components are bonded to carbon fiber-reinforced composites after curing. It is known that minute amounts of contamination on the surface may dramatically reduce the bond strength of the adhesive at those locations. For example, an adhesive bond between the clip 522 and the frame 515 may be relatively weak due to contamination between the adhesive and the frame 515. Thus, the bond strength may be less than that required during use of the frame 515. To solve the contamination problem, it is known to construct a dedicated "clean room" and similar environments from which known contaminants are excluded. However, installation and maintenance of a clean room environment is expensive both in terms of capital and operating costs.

As an alternative to clean rooms, in one embodiment of the invention, a bracket 800 may be mechanically secured to the fiber-reinforced composite. The bracket 800 shown in FIGS. 18, 19, and 20 may represent a clip 522, a clip 712, and/or a buckle 714 shown in FIGS. 2A, 8, and 16, for example. The bracket 800 may be configured to be secured to the frame 515, for example, by a mechanical or interference type arrangement. This bond may not rely completely or even predominantly on the tensile and/or shear strength of an adhesive to retain the clip 522 secured to the frame 515 or pan 520.

By way of example, and with reference now to FIG. 18, the bracket 800 may be configured with two J-shaped extensions 802 that extend laterally from legs 804. The extensions 802 are inserted into corresponding L-shaped through-holes 806 formed in the frame 515, for example. Though not shown, the legs 804 of the bracket 800 are resiliently biased outward as indicated by the arrows in FIG. 18. To insert the extensions 802 into the through-holes 806, the extensions 802 may be squeezed together or inserted in another manner in which the J-shaped extensions 802 are positioned to cooperate with the L-shaped through-holes 806. Once positioned, the legs 804, which are biased outward, maintain the J-shaped extensions 802 in a position that resists forces tending to pull the bracket 800 from the frame 515. In this regard, the J-shaped extensions 802 create an interference with the frame 515 such that it resists removal of the bracket 800 from the frame 515. Any clearance between the legs 804 and extensions 802 may be filled with a sealant, such as, PROSEAL™ as set forth above or a wedge of material (not shown) may be used to partially fill any clearance between the legs 804 and the frame 515. The bracket 800 may be made of metal or plastic or another material. In this manner, materials for bracket 800 that would not otherwise form a strong bond with the cured composite may be used. Furthermore, the bracket 800 may have a rectangular or round cross-sectional configuration. As such, the bracket 800 may be cut from a straight resilient wire or resilient flat stock and then bent into a configuration, such as, the configuration shown.

By way of additional example, and with reference to FIG. 19, the bracket 800 may include legs 812 having lateral extensions 814 extending generally perpendicular to legs 812. The extensions 814 may extend laterally to a greater distance than the J-shaped extensions 802 shown in FIG. 18. However, the legs 812 of bracket 800 shown in FIG. 19 may not be outwardly biased and therefore may not forcibly contact the frame 515 following installation thereof. A through-hole 816 may include a lateral extension 818 that is configured to receive extensions 814. Through-hole 816 may be defined in part by a plug 819. In this regard, following insertion of the bracket 800 in the frame 515, the plug 819 is inserted. In addition, following insertion of the plug 819, a sealant may be used to seal any space between the legs 812 and the frame 515 and the legs 812 and the plug 819 to inhibit leakage of fluid therethrough.

By way of yet another example, and with reference to FIG. 20, the bracket 800 may have a pin 820 (e.g. a roll pin) secured or through each leg 812. Corresponding openings 822 may be machined in the frame 515. These openings 822 may be configured to receive the legs 812 along one portion thereof and the pin 820 in another portion thereof. Thus, the openings 822 together with the pin 820 are configured to create an interference fit between the bracket 800 and the frame 515. This configuration resists removal of the bracket 800 during usage thereof. While FIG. 20 illustrates the pin 820 recessed within a portion of opening 822, embodiments of the invention are not so limited. The opening 822 may extend uniformly through the frame 515 such that an interference fit may be generated with the surface of the frame 515. In addition, although not shown, the pin 820 may be non-linear to resist unintentional pullout from the leg 812. For example, each end of the pin 820 may be bent or angled relative to a central portion. When inserted, the central portion may pass through the leg 812. The bent or angled portion may then provide a mechanical interference with the hole in each leg 812. The pin 820 may, therefore, require pulling or pushing at an angle relative to the leg 812 to withdrawal the pin 820 from the leg 812.

Furthermore, it will be appreciated that while reference is made to the frame 515 in conjunction with the bracket 800, the bracket 800, shown in any of FIGS. 18-20, may be used in conjunction with an opening machined in the drip pan 520 and/or any of the port covers 702. Further in this regard, a broken or otherwise non-functional bracket may be replaced when the helicopter is in the field simply by removing the sealant, withdrawing the non-functional bracket, inserting a new bracket 800, and sealing any clearance between the bracket 800 and component.

While the present invention has been illustrated by the description of embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details and drawings shown and described. Accordingly, departures may be made from such details without departing from the scope of the general inventive concept.

What is claimed is:

1. A drip pan apparatus for use with a helicopter having a cabin section, a rotor transmission oriented at least in part above the cabin section, a rotor transmission access opening defined by an airframe member of the helicopter in the ceiling of the cabin section, a skirt secured to the airframe member around the periphery of the access opening, and a wire bundle between the rotor transmission and the cabin section, the drip pan apparatus comprising:
   a frame adapted to be attached to the skirt, the frame having an inwardly-facing peripheral surface;
   a drip pan configured to cooperate with the frame and having an outwardly-facing peripheral surface; and
   a seal member disposed between the outwardly-facing peripheral surface and the inwardly-facing peripheral surface, wherein at least one of the frame and the drip pan has a discontinuous edge structure configured to face the transmission to accommodate the wire bundle proximate the frame and/or the drip pan when the frame is attached to the helicopter and the drip pan is removably secured to the frame.

2. The drip pan apparatus of claim 1, wherein the discontinuous edge structure includes a groove extending along a limited length of a peripheral edge of the drip pan, the groove being configured to face the wire bundle when the pan is installed in the frame.

3. The drip pan apparatus of claim 1, wherein the discontinuous edge structure includes a recess formed in the frame that defines a thickness of the frame that is less than a thickness of the frame in a region adjacent the discontinuous edge structure, the recess being configured to face the wire bundle when the frame is installed on the skirt.

4. The drip pan apparatus of claim 1, wherein the frame has an inner rim that is configured to face the rotor transmission and a recess is formed in the inner rim so as to extend across the width of the inner rim, the thickness of the frame from the recess to an opposing surface of the frame being less than the thickness of the inner rim to the opposing surface, the recess being configured to face the wire bundle when the frame is installed on the skirt.

5. The drip pan apparatus of claim 1, wherein when the drip pan is installed in the frame, the outwardly-facing peripheral surface of the drip pan is exposed to the rotor transmission in the region of the discontinuous edge structure.

6. The drip pan apparatus of claim 1, wherein the discontinuous edge structure includes a recessed portion in the drip pan, the recessed portion having a tapered surface producing a reduced through-thickness region along a limited peripheral edge portion of the drip pan.

7. The drip pan apparatus of claim 1, wherein the discontinuous edge structure includes a recess formed along a limited peripheral edge portion of the frame, the recess producing a reduced through-thickness region in the frame, and a recessed portion formed along a limited peripheral edge portion of the drip pan, the recessed portion producing a reduced through-thickness region in the pan, and
   when the pan is installed in the frame, the recessed portion in the pan aligns with the recess in the frame.

8. In combination:
   a multi-passenger helicopter comprising:
      a flight deck;
      a cabin section rearward of said flight deck;
      a rotor transmission oriented at least in part above said cabin section;
      a wire bundle operatively coupled to the rotor transmission; and
      a transmission access opening within said cabin section for providing access to said rotor transmission, the wire bundle being exposed to the cabin section through the transmission access opening; and
   a drip pan apparatus for covering said transmission access opening, said drip pan apparatus comprising:
      a frame adapted to mount to said transmission access opening, said frame having an inwardly-facing peripheral surface extending around said frame;
      a drip pan having an outwardly-facing peripheral surface extending around said drip pan; and
      a seal member disposed between said inwardly-facing peripheral surface and said outwardly-facing peripheral surface, wherein at least one of the frame and the drip pan has a discontinuous edge structure configured to face the transmission to accommodate the wire bundle proximate the frame and/or the drip pan when the frame is attached to the helicopter and the drip pan is removably secured to the frame.

* * * * *